US006553297B2

(12) United States Patent
Tashiro et al.

(10) Patent No.: US 6,553,297 B2
(45) Date of Patent: Apr. 22, 2003

(54) INTEGRATED VEHICLE CONTROL SYSTEM

(75) Inventors: Tsutomu Tashiro, Nagoya (JP); Noboru Miyamoto, Kariya (JP); Takehito Fujii, Kariya (JP); Yoshifumi Kato, Nishikamo-gun (JP); Toshiki Matsumoto, Kariya (JP); Tomohiro Kato, Toyohashi (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/907,501

(22) Filed: Jul. 18, 2001

(65) Prior Publication Data

US 2002/0016659 A1 Feb. 7, 2002

(30) Foreign Application Priority Data

Jul. 26, 2000 (JP) ........................................ 2000-225501

(51) Int. Cl.[7] ................................................ G06F 7/00
(52) U.S. Cl. ........................................................ 701/48
(58) Field of Search ................................ 701/45, 48, 33; 307/9.1

(56) References Cited

U.S. PATENT DOCUMENTS

| 5,274,638 A | | 12/1993 | Michihira et al. ......... 370/85.1 |
| 5,351,776 A | | 10/1994 | Keller et al. ................ 180/79.1 |
| 5,790,965 A | * | 8/1998 | Abe ............................... 701/29 |
| 5,835,873 A | * | 11/1998 | Darby et al. .................. 701/45 |
| 6,154,688 A | | 11/2000 | Dominke et al. ............... 701/1 |

\* cited by examiner

Primary Examiner—Yonel Beaulieu
(74) Attorney, Agent, or Firm—Nixon & Vanderhye, P.C.

(57) ABSTRACT

In a vehicular control system, when in the engine ECU, ATECU or brake ECU there occurs important information which requires an urgent response by any of the other ECUs, the important information is transmitted directly to the corresponding ECU through an important information communication line L1 without going through a manager ECU 10. Therefore, a controller in the ECU receives the important information and immediately controls the corresponding component based on the important information.

24 Claims, 17 Drawing Sheets

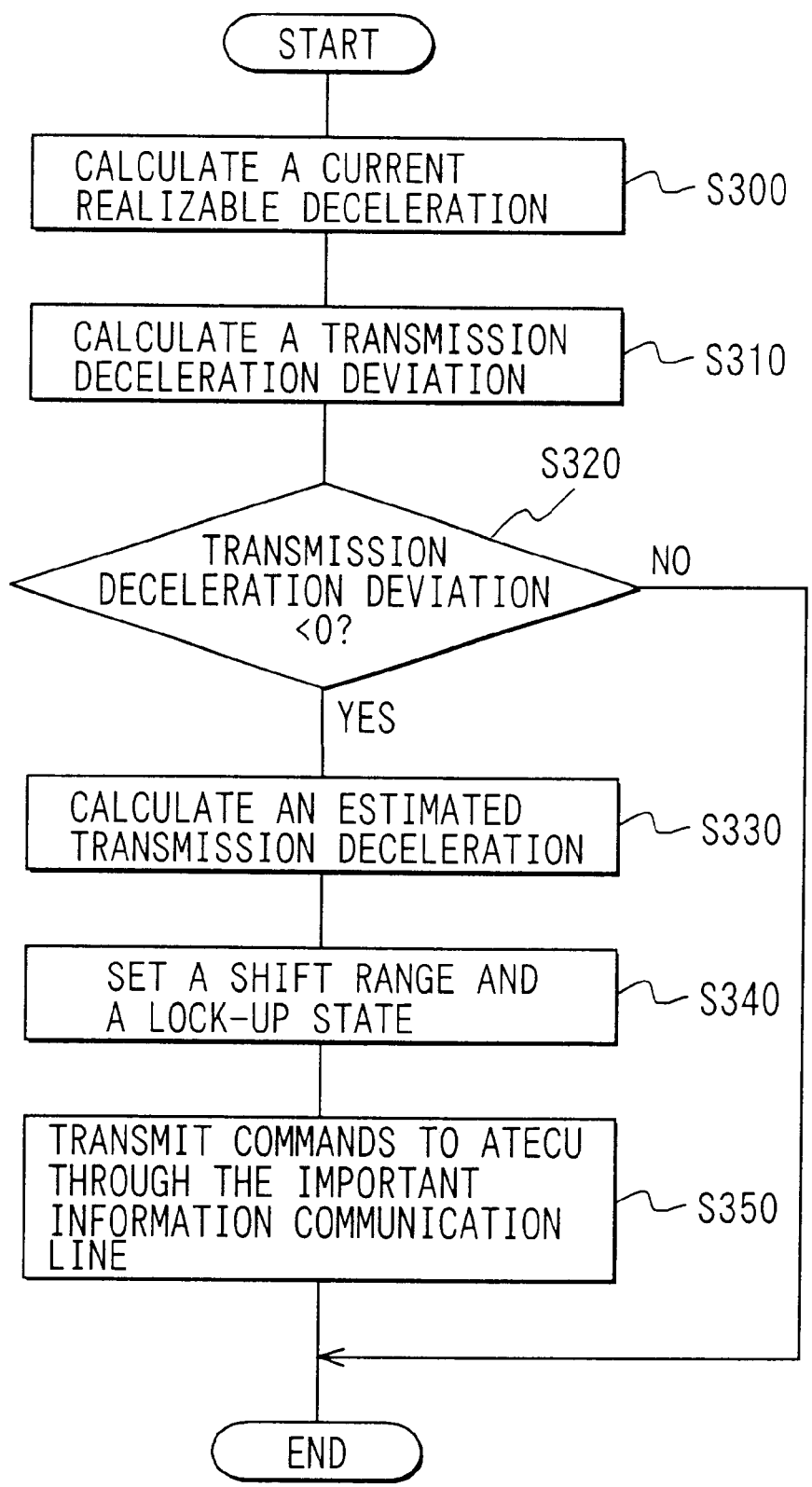

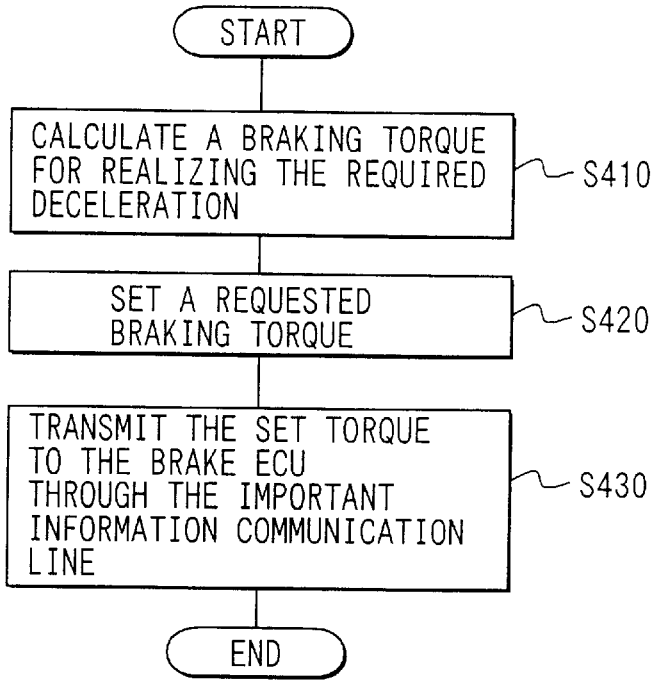
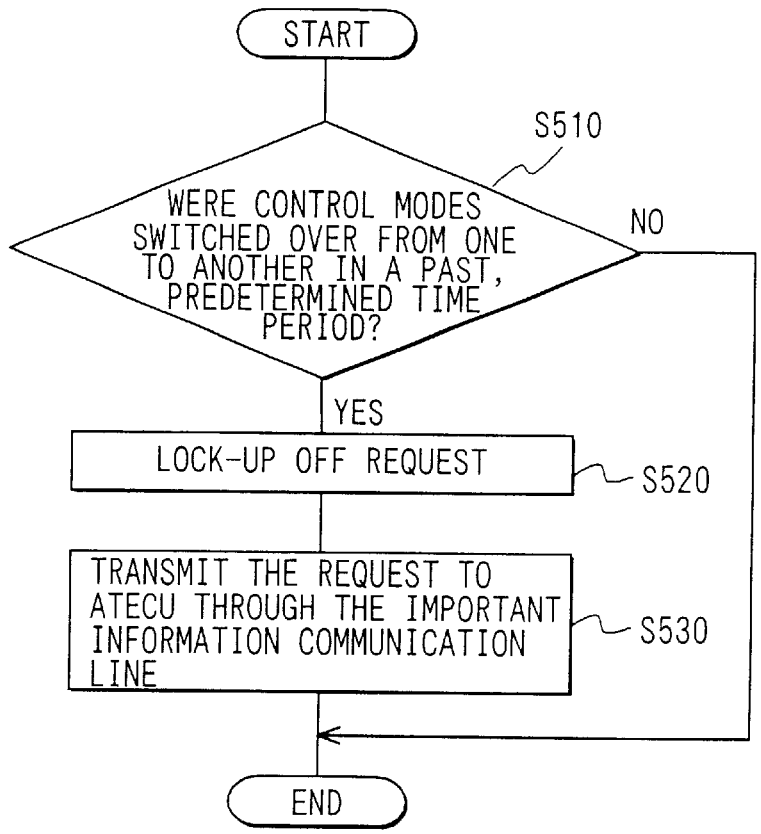

INTEGRATED VEHICLE CONTROL SYSTEM

CROSS-REFERENCE TO RELATED APPLICATION

The present invention is related to Japanese patent application No. 2000-225501, filed Jul. 26, 2000; the contents of which are incorporated herein by reference.

FIELD OF THE INVENTION

The present invention relates to an integrated vehicle control system for integratedly controlling multiple components mounted on a vehicle, and more particularly, the present invention relates to an integrated vehicle control system that provides a quick exchange of important information between such components.

DESCRIPTION OF THE RELATED ART

Recently, to cope with an increase in system scale due to an increase in the number of components of a vehicle, there has been proposed an integrated vehicle control system which permits exchange of data between control elements provided for each of plural such vehicular components and which thereby realizes stable control for the vehicle as a whole.

For example, in an integrated vehicle control system disclosed in JP-A No. Hei 10-250417, control elements for controlling engine output, driving force and braking force and control elements for controlling vehicular operation characteristics are arranged in the form of a hierarchical structure. And, there is provided an entire vehicle adjusting unit which controls those control elements integratedly. According to the integrated vehicle control system, by supply required characteristics successively from high to low hierarchical level, component operation (actuator) is determined where each control element controls, and an optimum control is realized with the entire vehicle.

Thus, by dividing the vehicular control system into multiple systems, the number of components of a control system that is subject to design modification to match a change in system specification is decreased and the period required for the design modification is shortened thereby. Or, by keeping the components independent of each other, it is possible to develop components concurrently and shorten the development period for a vehicle as a whole.

However, in such a system wherein the vehicle is controlled in a hierarchical manner, even when urgent information is output from a certain control element to another control element, control is performed through the foregoing entire vehicle adjusting unit, resulting in a response delay. Accordingly, there is a fear that the vehicle behavior may become unstable.

For example, a problem arises in case of making an ACC (Adaptive Cruise Control) wherein a vehicle-to-vehicle distance between this vehicle and another vehicle traveling ahead is measured and the driving and braking force of this vehicle are controlled according to the thus-measured vehicle-to-vehicle distance, thereby maintaining an appropriate vehicle-to-vehicle distance. More particularly, when the vehicle traveling ahead decelerates suddenly or when a vehicle breaks into the front of this vehicle at a very short distance, the control decelerates the vehicle rapidly for preventing a rear-end collision. When this control is made by the engine control for example, the throttle valve is fully closed to diminish the driving force if the engine is in operation. If the control for deceleration is made by a transmission control, the gear shift range (change gear ratio) is switched to a low speed. Further, if brake control is used, brakes are applied.

However, arithmetic operations for the above controls are generally performed according to a predetermined cycle, so the actuator operation delays corresponding to the arithmetic operation cycle. In many cases, this arithmetic operation cycle is set longer than an operation limit of each actuator, i.e., longer than a cycle below which it is impossible to make a response even if the actuator is driven. In this case, therefore, a delay in operation of the actuator is so slight as causes no problem in normal vehicular operations, but causes a problem in case of an urgent operation.

Particularly, where a portion (the entire vehicle adjusting unit in the above example) which determined a behavior of the entire vehicle and a portion which drives actuators are provided on separate units and are connected together through a communication line, a response delay caused by communication is added and the danger of collision increases.

A problem arises also where on a road surface having a small coefficient of friction, such as a frozen road, the system must exhibit a traction function to prevent wheel spin and allow the vehicle to travel stably by adjusting both braking force and generated torque from the engine. For example, if the brake system becomes deteriorated, it is necessary that generated torque be adjusted by only the engine to allow the vehicle to travel stably. But, it is necessary to quickly execute an engine control processing for the deteriorated function of the brakes.

Particularly, in the foregoing unexamined publication, information of this deterioration (urgent information) is transmitted while going back the hierarchy to a level at which a command can be issued from the brake side to the engine side, and a command is issued to the engine on the basis thereof. In this case, if the engine and the brakes, as well as a portion which outputs operation guides to the engine and the brakes, are provided on separate units connected through a communication line, the above urgent information passes the communication line many times and the influence of the resulting delay in response is by no means negligible for maintaining the vehicle stable.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description. In the drawings:

SUMMARY OF THE INVENTION

The present invention has been accomplished in view of the above-mentioned drawbacks and it is an object of the invention to provide a system for integratedly controlling plural components mounted on a vehicle and capable of effecting a quick exchange of important information between components and keeping the vehicle behavior stable.

For achieving the above-mentioned object, in a first aspect of the present invention, there is provided an integrated vehicle control system wherein plural components mounted on a vehicle are respectively controlled by plural component control units corresponding to those components. A manager control unit of a higher order than the component control units issues an operation guide command for controlling the components. The manager control unit and the component control units, as well as the component control units themselves, are respectively connected through communication lines.

Therefore, the behaviors of the components are controlled respectively by the corresponding component control units and the behavior of the entire vehicle to be controlled can be controlled by the manager control unit. Thus, also in the system of the present invention, as is the case with the foregoing conventional system, when part of the components is changed due to a change in specification for example, all that is required is merely altering the corresponding component control unit. In system design, moreover, it suffices to design each control unit individually and therefore it is possible to shorten the development period.

In each component control unit, a manipulated variable (controlled variable) calculating means calculates a manipulated variable of the corresponding component according to an operation guide received from the manager control unit and a control means controls the component based on the manipulated variable thus calculated. Further, an important information transmitting means is provided in at least one of the plural component control units.

Based on an operational condition of the component concerned, the important information transmitting means determines whether an urgent control for another component control unit is necessary or not. If the result is affirmative, the means transmits important information for the urgent control directly to another component control unit through the communication line. Then, the control means in the component control unit which has received the important information, controls the component according to the important information.

The "important information" as referred to herein indicates control information of a high urgency to be used for the operation of each component for avoiding, for example, collision of the vehicle, occurrence of an abnormal shock against the vehicle body, or the destruction of vehicular constituent parts. It is different from control information (general information) for other processings, i.e., control information to be used for the operation of each component in normal vehicular traveling.

Thus, according to this integrated vehicle control system, if the operational condition of each component is one in normal control, the important information transmitting means determines this information to be general information and does not function at all. As in the foregoing conventional system, this general information is once transmitted to the manager control unit, which in turn determines an operation guide for each component taking the general information, as well as other information pieces, into account. The operation guides thus determined are transmitted to the corresponding component control units.

On the other hand, in the event there occurs urgent information in a component, the important information transmitting means determines the information that is important information and transmits this important information to the control means in the corresponding component control unit directly without going through the manager control unit.

Therefore, the control means in the component control unit which has received the important information can control the corresponding component immediately according to the important information. As a result, the delay in response which occurred in the conventional system due to going through the manager control unit no longer occurs. And, it is possible to quickly cope with a vehicular urgent condition and keep the vehicular behavior stable.

Although a description has been given about the configuration where if important information occurs in a certain component control unit, a quick exchange of important information can be done between the component control unit and another component control unit, there is a case where important information occurs in the manager control unit and it is necessary to perform a quick processing based on the important information. A configuration meeting such a demand is adopted by an integrated vehicle control system according to the second aspect of the present invention.

In the second aspect of the invention, an entire vehicular operation determining means in a manager control unit determines an operation guide for the entire vehicle based on operation information on components received from component control units through a communication line, then based on the operation guide for the entire vehicle an operation guide determining means determines an operation guide for each component.

If each operation guide determined by the operation guide determining means is general information indicative of normal control, a general information transmitting means transmits this general information to the corresponding component control unit through the operation guide determining means. But if the operation guide for the entire vehicle determined by the entire vehicle operation determining means is important information, a second important information transmitting means transmits this important information to the corresponding component control unit directly without going through the operation guide determining means.

Thus, since the operation guide determining unit is not gone through, the second important information transmitting means can transmit important information to the corresponding component control unit side quickly. The control means in the component control unit which has received the important information, controls the corresponding component immediately according to the important information. Thus, also upon occurrence of urgent information in the manager control unit, it is possible to take a quick countermeasure and keep the vehicle behavior stable.

As to the exchange of important information between component control units in the above configuration, there may be adopted a mode wherein when important information occurs in one component control unit and is to be transmitted to another component control unit, the one component control unit transmits the contents of the important information or an operation guide based thereon to another component control unit. Then, a manipulated variable calculating means in the another component control unit which has received it calculates a predetermined control variable based on the operation guide, and the control means concerned executes a control based on the operation guide. Also as to the exchange of important information between the manager control unit and component control units, there may be adopted a configuration wherein the manager control unit transmits only an operation guide for a component control unit as important information to the component control unit. And, a predetermined manipulated variable is calculated on the component control unit side which has received it. This mode is preferred from the standpoint of maintaining the independence of the manager control unit and component control units and shortening each development period.

However, in such a configuration wherein only an operation guide is transmitted from the manager control unit or from one component control unit to a corresponding component control unit, a manipulated variable intended by the manager control unit or one component control unit is not always set on the corresponding component control unit side in the case of an operation control which must be done urgently. For example, where the corresponding component control unit is an engine control unit, even if an operation guide for a certain reduction of torque is output from the manager control unit or one component control unit, various control variables, including throttle opening and fuel injection volume, are combined to realize the decrease of torque in the engine control unit. In this case, even if the manager control unit or one component control unit side intends to only control in a fully closed state of the throttle valve, such a control is not always executed on the engine control unit side.

Therefore, a mode may be adopted wherein a manipulated variable is calculated on the manager control unit side or on one component control unit side.

As to the exchange of important information between component control units, there may be adopted a configuration according to the third aspect of the present invention. Here, if it turns out from the operational condition of one component that an urgent control is needed for another specific component, a second manipulated variable calculating means in the one component control unit calculates a manipulated variable for controlling the specific component and the important information transmitting means transmits the thus-calculated manipulated variable as important information to the control means in the component control unit which controls the specific component. In this case, the control means in the component control unit which received the important information controls the specific component according to the received manipulated variable.

As to the exchange of important information between the manager control unit and the component control units, there may be adopted a configuration according to the fourth aspect of the present invention wherein the manager control unit is provided with a manipulated variable calculating means. Here, when the operation guide for the entire vehicle determined by the entire vehicle operation determining means is important information, the manipulated variable calculating means calculates a manipulated variable for controlling a specific component according to the important information. The second important information transmitting means transmits the thus-calculated manipulated variable as important information directly to the control means in the component control unit which controls the specific component. In this case, upon receipt of the manipulated variable transmitted as important information from the second important information transmitting means, the control means in the component control unit controls the component according to the received manipulated variable.

With such a configuration, the component corresponding to the specific component control unit can be controlled based on the manipulated variable intended by the manager control unit or one component control unit. Moreover, since such a calculated manipulated variable is transmitted directly to the control means without going through the manipulated variable calculating means, the processing in the specific component control unit can be done quickly.

In the manager control unit and the component control units, there may simultaneously occur multiple types of information portions as important information portions. In this case, there may be adopted a configuration according to the fifth aspect of the present invention wherein the important information transmitting means and the second important information transmitting means transmit those important information potions according to a predetermined priority sequence.

Likewise, the component control units may receive plural types of information portions simultaneously as important information portions. In this case there may be adopted a configuration according to the sixth aspect of the present invention wherein the control means in the component control units executes control processing based on those important information portions according to a predetermined priority sequence.

Where the manipulated variable calculating means in the manager control unit takes the mode of calculating a manipulated variable according to only an operation guide based on important information and if the operation guide based on that important information and the operation guide which the operation guide determining means decided just before are greatly different from each other, vehicle may be shocked due to an abrupt change in control based on those operation guides. To avoid such an inconvenience, there may be adopted a configuration according to a seventh aspect of the present invention wherein the manipulated variable calculating means, when calculating a manipulated variable based on important information, makes reference to the operation guide decided just before by the operation guide determining means. By so doing, when it is determined that a sudden change in control will occur due to a change of operation guide, there may be adopted such a control form as approaches the control processing based on important information according to the degree of urgency indicated by the important information. More specifically, if the degree of urgency is not so high, there may be performed a processing such as a gentle shift of the control, whereby the vehicle behavior can be maintained more stably.

As concrete examples of the exchange of important information referred to above, there are considered various examples. For example, according to the eighth aspect of the present invention there is provided an integrated vehicle control system having, as the component control units, a power control unit for controlling a driving force generator mounted as a component on the vehicle and a brake control unit for controlling brakes mounted as a component on the vehicle, wherein when the function of the brakes is deteriorated, the brake control unit transmits to the power control unit a command to the effect of decreasing the driving force of the driving force generator as important information.

With such a configuration, it is possible to assist the brake control for the deteriorated brakes and thereby possible to prevent the occurrence of an accident such as collision of the vehicle with an object present ahead of the vehicle.

In the ninth aspect of the present invention, there is provided an integrated vehicle control system having, as the component control units, a power control unit for controlling a driving force generator mounted on the vehicle and a transmission control unit for controlling a transmission mounted on the vehicle. Wherein, during a shifting operation of the transmission, the transmission control unit transmits to the power control unit a command to the effect of decreasing the driving force of the driving force generator as important information.

According to this configuration it is possible to suppress shock which the vehicle receives during shifting. As the driving force generator which the power control unit controls, there is mentioned one which is driven by power control such as a motor drive. But when adopting an internal combustion engine as in the tenth aspect of the present invention, there is considered, as the control means in the power control unit, one which executes, when decreasing the driving force of the engine according to important information, at least one of such known controls as an intake volume decreasing control for decreasing the amount of intake air to the engine, an ignition timing retarding control for retarding the ignition timing for the engine, and an injection volume decreasing control for decreasing the amount of fuel to be injected to the engine. With the injection volume decreasing control is included a control of making the injection volume zero, i.e., an injection cut-off control.

A transmission equipped with a torque converter may be provided with a lock-up mechanism for the improvement of fuel economy. In such a transmission, input and output of the torque converter are directly coupled together mechanically by a lock-up clutch in a relatively high vehicle speed region, whereby a transfer loss caused by slippage in the torque converter is eliminated and fuel economy is improved.

In a lock-up condition, however, vibrations and changes in torque which have been absorbed are no longer absorbed due to slippage in the torque converter, so that, for example, when the engine torque changes suddenly, it is transmitted as a shock to the vehicle driver. Such an inconvenience can be avoided by adopting a configuration according the eleventh aspect of the present invention wherein when suddenly changing the air-fuel ratio during combustion of the engine, the power control unit transmits a command to release the lock-up mechanism of the transmission as important information to the transmission control unit.

By thus releasing the lock-up mechanism during sudden change in engine torque, the sudden change in engine torque is transmitted to the transmission in a mitigated state by the torque converter, so that the shock generated in the vehicle can be suppressed.

During lock-up, there also is a problem that the likelihood of engine stall on sudden braking increases, other than the transfer of vibrations and changes of torque. For example, if a sudden brake is applied when the vehicle is traveling on a road having a small coefficient of friction such as a snow-covered road or a frozen road, the wheels may be locked, that is, the number of revolutions of driving wheels may become zero. As such, if the torque converter is in a lock-up condition, the engine and the wheels assume a mechanically connected state, so that the rotation of the engine is stopped, causing engine stall. Even if the vehicle has an anti-lock function to decrease the braking force of the brakes to prevent locking of the wheels upon occurrence of wheel locking, it is impossible to avoid engine stall completely.

For avoiding such an inconvenience, there may be adopted a configuration according to the twelfth aspect of the present invention wherein at the time of starting the operation of the brakes, the brake control unit transmits to the transmission control unit a command to the effect of releasing the lock-up mechanism in the transmission as important information.

According to this configuration, lock-up is cancelled when the brakes are in operation, so even upon locking of wheels, the engine can continue its rotation by slippage of the torque converter and hence it is possible to prevent the occurrence of engine stall.

According to the above anti-lock function, in the event the wheels are locked by braking with the brakes, the braking force for the wheels is decreased to prevent locking of the wheels. On the other hand, when braking with the brakes is not performed, that is, when wheels are locked with the force of engine brake, there may be adopted a method wherein the force of engine brake is decreased, i.e., the change gear ratio in the transmission is set to the highest side, to prevent wheel locking.

In this connection, there may be adopted a configuration according to the thirteenth aspect of the present invention, wherein when starting the anti-lock function of the brakes, the brake control unit transmits to the transmission control unit a command as important information to control the change gear ratio of the transmission to make the ratio of input number of revolutions to output number of revolutions in the transmission smaller.

By carrying out the anti-lock function in this way, the occurrence of an accident on a snow-covered road or a frozen road caused by wheel locking is prevented.

Further, in a vehicle equipped with a continuously variable transmission as a component, it is desirable that the change gear ratio be returned to the lowest side until the vehicle stops. Where the change gear ratio cannot be returned to the lowest side until vehicle stop due to sudden braking, it is desirable to make an auxiliary control for increasing the engine torque and thereby restoring the change gear ratio to the low side.

More specifically, it is desirable to adopt a configuration according to the fourteenth aspect of the present invention wherein the important information transmitting means in the transmission control unit transmits to the power control unit information as important information to change gear ratio to make the ratio of input number of revolutions to output number of revolutions in the continuously variable transmission larger. And, when the power control unit receives the important information from the transmission control unit while the vehicular brakes are in operation, the control means provided therein controls to enhance the driving force of the driving force generator.

In this case, if there is adopted, as the driving force generator which the power control unit controls, an internal combustion engine as in the fifteenth aspect of the present invention, as a control by the control means in the power control unit, at least a control is executed such as an intake volume increasing control for increasing the amount of intake air to the engine and an injection volume increasing control for increasing the amount of fuel to be injected to the engine.

A certain type of a vehicle is equipped with a radar system for measuring the distance between the vehicle and an object present ahead of the vehicle for preventing collision of the two. In such a vehicle, whether there is a danger of collision or not is determined based on the distance from the object present ahead of the vehicle thus measured by the radar system and the vehicle speed and a travel control is made for avoiding the collision. Also in this case, it is necessary that the determination on collision and a countermeasure thereto be done as quickly as possible.

In the vehicle being considered, such a requirement can be met by adopting a configuration according to the sixteenth aspect of the present invention, wherein information from the radar system is input to the manager control unit. The second important information transmitting means determines whether the danger of collision between the vehicle and an object present ahead of the vehicle is high or not based on the information provided from the radar system. And, if the result is affirmative, the second important information transmitting means transmits to the corresponding component control unit a deceleration command as important information for causing a predetermined component to decelerate the vehicle.

According to this configuration, in the manager control unit, an operation guide for making a deceleration control best suited for avoiding collision is decided. Or, a manipulated variable therefor is calculated, and it is possible to let each component control unit to execute a desired control quickly.

As concrete methods for the deceleration control, various methods are available, of which a suitable one may be selected in consideration of suppressing shock of the vehicle caused by the urgency of the deceleration control.

If the urgency of the deceleration control is not so high, it is preferable to adopt a configuration according to the seventeenth aspect of the present invention wherein the deceleration control is made by decreasing the vehicular driving force. In this case, the second important information transmitting means may transmit a command for decreasing the driving force which the driving force generator mounted on the vehicle generates, as a deceleration command, to the power control unit which controls the driving force generator. This is preferred because the driving force of the driving force generator decreases gradually by the inertia thereof, allowing the deceleration control to be carried out in a relatively gentle manner. Therefore, the shock which the vehicle undergoes does not become so large.

If the danger of collision cannot be avoided by such a driving force decreasing control, it is proposed to adopt a configuration according to the eighteenth aspect of the present invention wherein the deceleration control is assisted by a brake control using the transmission. According to this configuration, the second important information transmitting means transmits a command for setting the change gear ratio of the transmission mounted on the vehicle in a direction in which the ratio of input number of revolutions to output number of revolutions in the transmission becomes larger, as a deceleration command, to the transmission control unit. By adopting such a control method, engine brake is exerted on the vehicle, thus permitting the vehicle to decelerate quickly.

If it will be impossible to avoid the danger of collision even by the adoption of such a control method, it is proposed to add a braking force induced by the brakes as in the nineteenth aspect of the present invention. In this case, the second important information transmitting means transmits a command for increasing the braking torque generated by the brakes mounted on the vehicle, as a deceleration command, to the brake control unit which controls the brakes.

Adding the braking force induced by the brake system to the deceleration control may produce a large shock of the vehicle, but is regarded as being unavoidable for the prevention of collision.

According to the integrated vehicle control system of the present invention, a plurality of components mounted on a vehicle are controlled integratedly to control the behavior of the entire vehicle induced by operations of the plural components. The control system comprises component control units for controlling the components respectively and a manager control unit which issues an operation guide command to each of the component control units for bringing the behavior of the entire vehicle to a target state. It is not always necessary to implement these control units by independent hardware configurations. For example, a specific component control unit and a manager control unit may be implemented using a single control unit constituted by a microcomputer and the other component control units may be implemented by the operation of a control unit different from the control unit.

However, since the design of each control unit is performed for each hardware configuration, if plural control unit functions are implemented in a single control unit, the design becomes complicated. Moreover, if a specific component is altered due to a design modification for example, there arises the problem that not only the control unit for the altered component but also the other control units incorporated in the single control unit together with the control unit for the altered component are required to be altered.

To solve this problem it is preferable to adopt a configuration according to the twentieth aspect of the present invention wherein the manager control unit and multiple component control units, which constitute the integrated vehicle control system of the invention, are each constituted by an independent electronic unit which is a microcomputer, and are interconnected through a communication line capable of mutually transmitting data.

In this case, if the communication line comprises a communication line for the transmission of important information and a communication line for the transmission of other general information pieces, as in the twenty-first aspect of the present invention, the transmission route is simplified, whereby it is possible to prevent the congestion of communication and to transmit important information more positively and quickly.

BRIEF DESCRIPTION OF THE DRAWINGS

The present invention will become more fully understood from the detailed description and the accompanying drawings, wherein:

FIG. 8 is a flow chart showing an important processing executed by a transmission manipulated variable calculating unit in the manager ECU according to the invention;

FIG. 9 is a flow chart showing an important processing executed by a brake manipulated variable calculating unit in the manager ECU according to the invention;

FIG. 10 is a flow chart showing an important processing which requests another ECU for operation in the engine ECU according to the invention;

DETAILED DESCRIPTION OF PREFERRED EMBODIMENTS

Preferred embodiments of the present invention will be described hereinunder with reference to the accompanying drawings.

First Embodiment

Figure 1:
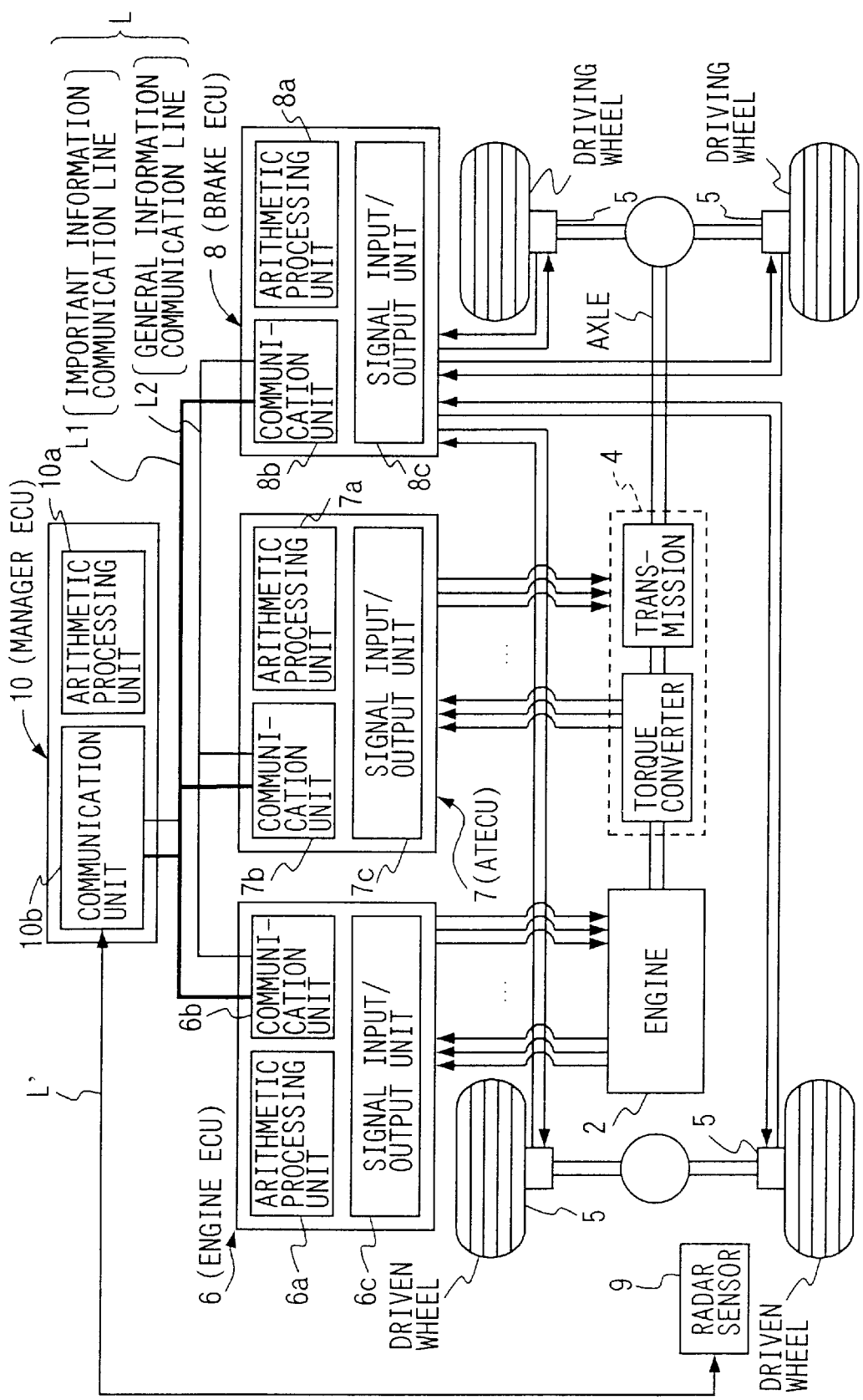
FIG. 1 is a block diagram showing a configuration of an integrated vehicle control system embodying the present invention.

FIG. 1 is a block diagram showing an entire configuration of an integrated vehicle control system according to the first embodiment of the present invention.

The integrated vehicle control system of this embodiment is a system for integratedly controlling an engine 2 (driving force generator) and an automatic transmission (a multi-stage transmission; hereinafter referred to simply as "AT"), which are components of a vehicle drive system. The system also controls brakes 5 as a component of a vehicular braking system. As component control units used in the present invention, there are provided an engine ECU 6 (power control unit), an ATECU 7 (transmission control unit) and a brake ECU 8 (brake control unit) for controlling the engine 2, AT 4 and brakes 5, respectively. Further, as a manager control unit used in the present invention there is provided a manager ECU 10 which issues operation guide commands to the engine ECU 6, ATECU 7 and brake ECU 8 for operation of the engine 2, AT4 and brakes 5.

The ECUs 6, 7, 8 and 10 are electronic control units constituted mainly by arithmetic processing units 6a, 7a, 8a and 10a, respectively. In the ECUs 6, 7, 8 and 10, there are incorporated communication units 6b, 7b, 8b and 10b, respectively, which are interconnected through a communication line L for data communication. Data for vehicle control can be transmitted and received through the communication units 6b, 7b, 8b, 10b and the communication line L.

The engine ECU 6, ATECU 7 and brake ECU 8 are for controlling the engine 2, AT 4 and brakes 5, respectively. In the ECUs 6, 7 and 8 are also incorporated signal input/output units 6c, 7c and 8c, respectively, for inputting detected signals from various sensors which detect the states of the engine 2, AT 4 and brakes 5 and for outputting drive signals to actuators provided respectively in the engine 2, AT 4 and brakes 5.

To the signal input/output unit 6c in the engine ECU 6 are connected sensors and switches such as an accelerator pedal opening sensor for detecting the amount of depression of an accelerator pedal by a driver of the vehicle, an air flow meter for detecting the flow rate (intake volume) of intake air, an intake air temperature sensor for detecting the temperature of intake air, a throttle opening sensor for detecting the degree of opening of a throttle valve, an oxygen concentration sensor for detecting the concentration of oxygen contained in exhaust gas, a knocking sensor for detecting knocking, a water temperature sensor for detecting the temperature of cooling water, a crank angle sensor for detecting a rotational angle and a rotational speed of a crank shaft, and an ignition switch. Also connected to the signal input/output unit 6c in the engine ECU 6 are various actuators for controlling the engine such as an injector provided for each cylinder in the engine 2, an igniter for generating high voltage for ignition, a fuel pump for pumping fuel from a fuel tank and supplying it to the injector, and a throttle valve driving motor for opening and closing a throttle valve installed in an intake pipe of the engine 2.

To the signal input/output unit 7c in the ATECU 7 are connected sensors and switches such as a revolution sensor for detecting the number of revolutions of an input shaft from a torque converter as a constituent of AT4 to the transmission, a vehicle speed sensor for detecting the vehicle speed from the rotation of a vehicle drive shaft connected to an output shaft of AT 4, an oil temperature sensor for detecting the temperature of hydraulic oil present within the AT 4, a shift position switch for detecting a shift position of a shift lever which is operated by the vehicle driver, and a stop lamp switch for detecting the state of a stop lamp which turns ON upon braking by the vehicle driver. Various actuators (solenoids) for AT control are also connected to the signal input/output unit 7c in the ATECU 7, such as a shift solenoid for switching over shift ranges, a line pressure solenoid for operating an engaging force of a shift clutch, and a lock-up pressure solenoid for operating a clamping force of a lock-up clutch which clamps together input and output shafts of a torque converter.

Further, to the signal input/output units 8c in the brake ECU 8 are connected sensors and switches such as a master cylinder pressure sensor for detecting an oil pressure of a master cylinder in each brake 5, a steering sensor for detecting a vehicular steering angle, and a yaw rate sensor for detecting a yaw rate of the vehicle. Also connected thereto is a brake actuator for generating a hydraulic pressure in the master cylinder for brake control.

At the front of the vehicle is installed a radar sensor 9 (radar system) of a known structure which utilizes, for example, ultrasonic wave, radio wave, laser beam, or infrared rays. With the radar sensor 9, it is possible to measure a relative distance between the vehicle and an object ahead of the vehicle and also measure in which direction the object is present. Information from the radar sensor 9 is input to the communication unit in the manager ECU 10 through a communication line L'.

The communication line L is composed of a communication line L1 for the transmission of important information and a communication line L2 for the transmission of other general information. The communication line L2 for general information transmits operational information on the engine 2, AT 4 and brakes 5 provided from the engine ECU 6, ATECU 7 and brake ECU 8 to the manager ECU 10 and also transmits operation guides which the manager ECU 10 determined after receipt of the operational information to the ECUs 6, 7 and 8.

On the other hand, the communication line L1 for important information transmits important information provided from the manager ECU 10 to the ECUs 6, 7 and 8 and also transmits important information provided from one of the ECUs 6, 7 and 8 to the other ECUs directly without going through the manager ECU 10.

As will be described later, upon receipt of important information through the important information communication line L1, the ECUs 6, 7 and 8 outputs control commands based on that important information to the engine 2, AT 4 and brakes 5 in preference to the operation commands received through the general information communication line L2.

In the ECUs 6, 7, 8 and 10, the arithmetic processing units 6a, 7a, 8a and 10a execute control processings (engine control processing, AT control processing, brake control processing, and synthetic control processing) for controlling the engine 2, AT 4, brakes 5 and the entire system according to control programs pre-stored in memory.

The following description is now provided about the control processings executed in the ECUs 6, 7, 8 and 10. The control processings each have a hierarchical structure and the contents thereof are classified into general processing and important processing as will be described below. The important processing is a control processing of a high urgency which is executed for avoiding, for example, collision of the vehicle, the occurrence of an abnormal shock against the vehicle body, and destruction of a vehicle component. The general processing is a control processing other than the important processing, i.e., a control processing which is executed in normal traveling of the vehicle.

Figure 2:
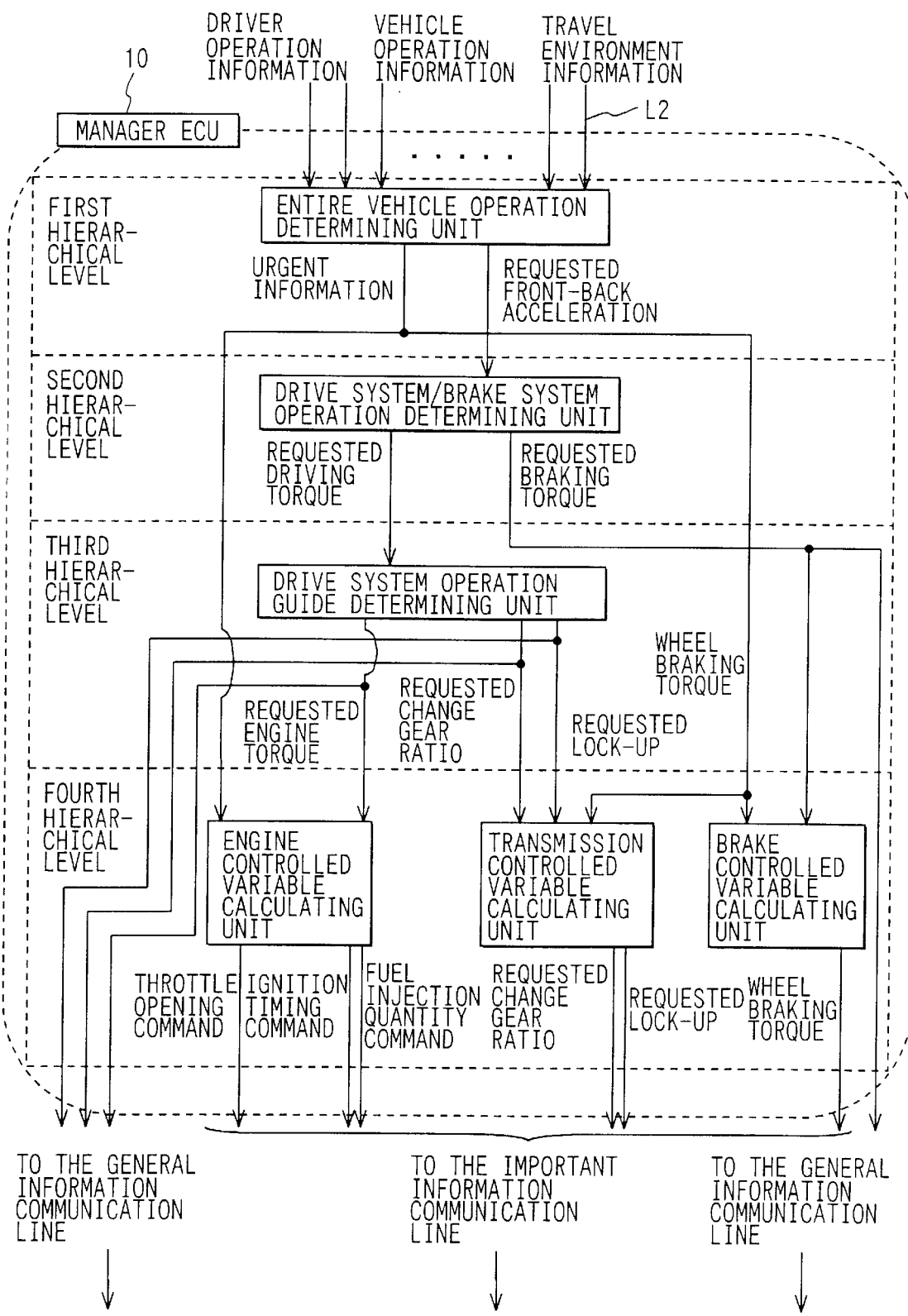
FIG. 2 is a block diagram of a control processing executed for vehicle control by a manager ECU according to the invention.

A description will first be given of the general processing with reference to FIGS. 2 to 5. FIG. 2 is a block diagram showing, in terms of functional blocks, a control processing which is executed in the manager ECU 10. As shown in the same figure, the control processing executed by the manager ECU 10 has a configuration of four hierarchical levels and the general processing is executed in the first to third hierarchical levels.

In an entire vehicle operation determining unit in the first hierarchical level, a vehicular front-back acceleration (also referred to as "requested front-back acceleration") which is requested is set according to information on operations performed by the vehicle driver such as the depression of the accelerator pedal or the brake pedal, information on vehicular operations such as vehicle speed and engine load, which are input through the general information communication line L2 from the engine ECU 6, and traveling environment information input from the radar sensor 9 and indicative of a positional relation to a vehicle traveling ahead.

Thus, a requested front-back acceleration is set according to ON/OFF of an ACC switch which selects execution or non-execution of ACC (Adaptive Cruise Control), the ACC being a vehicular travel control performed according to a relation to a front vehicle measured by the radar sensor 9.

To be more specific, when the ACC switch is OFF, it is determined that the vehicle driver wants to drive the vehicle by his or her own operation, and a requested front-back acceleration is set according to the amount of depression of the accelerator pedal detected by the accelerator pedal opening sensor or the amount of depression of the brake pedal detected by a brake stroke sensor.

On the other hand, when the ACC switch is ON and neither the accelerator pedal nor the brake pedal is depressed, it is determined that the vehicle driver wants the execution of ACC control to drive the vehicle, and a requested front-back acceleration is set according to relative distance and relative speed with respect to a front vehicle input from the radar sensor 9.

Further, when the ACC switch is ON and the accelerator pedal or the brake pedal is depressed, it is determined that the vehicle driver wants the vehicle to be driven while reflecting the driver's will based on ACC control, and a front-back acceleration corresponding to an intermediate acceleration between the above two requested front-back accelerations is set as a requested front-back acceleration.

Subsequently, in a drive system/brake system operation determining unit in the second hierarchical level, a wheel torque for implementing the requested front-back acceleration set above by the entire vehicle operation determining unit is calculated, and a driving torque or a braking torque for implementing the wheel torque thus calculated is calculated as a requested driving or braking torque serving as an operation guide. More specifically, a present travel resistance is estimated based on, for example, the vehicle speed detected by the vehicle speed sensor and a wheel torque for implementing the requested longitudinal acceleration is calculated based on the travel resistance. If the wheel torque thus calculated takes a positive value, the driving torque is set, while if it takes a negative value, a braking torque is set.

Then, in a drive system operation determining unit in the third hierarchical level, an engine torque, a change gear ratio, and a lock-up state (ON/OFF of the lock-up mechanism) for implementing the requested driving torque determined above by the drive system/brake system operation determining unit are calculated as a requested engine torque, a requested change gear ratio, and a requested lock-up state state, respectively, serving as operation guides.

More particularly, a requested change gear ratio and a requested lock-up state state are set based on the vehicle speed detected by the vehicle speed sensor and the above requested driving torque and with reference to preset shift map and lock-up map. Then, the requested driving torque is divided by the requested change gear ratio, and from the resulting value is subtracted an input torque adjustment quantity to be described later which is input from the ATECU 7 through the general information communication line L2. Further, the value thus obtained is divided by a torque amplification ratio of the torque converter corresponding to the requested lock-up state state, and the resulting value is set as a requested engine torque.

The requested engine torque thus set is sent to the engine ECU 6. Further, the requested engine torque, requested change gear ratio, and requested lock-up state state are transmitted to the ATECU 7 and the requested braking torque is transmitted to the brake ECU 8, each through the general information communication line L2.

In the above description, the entire vehicle operation determining unit corresponds to the entire vehicle operation determining means, the drive system/brake system operation determining unit and the drive system operation guide determining unit correspond to the operation guide determining unit, and the function of transmitting the operations guides determined by the drive system/brake system operation determining unit and the brake system operation guide determining unit through the general information communication line L2 corresponds to the function as general information transmitting means.

Next, reference will be made below to the general processing executed in the engine ECU 6.

Figure 3:
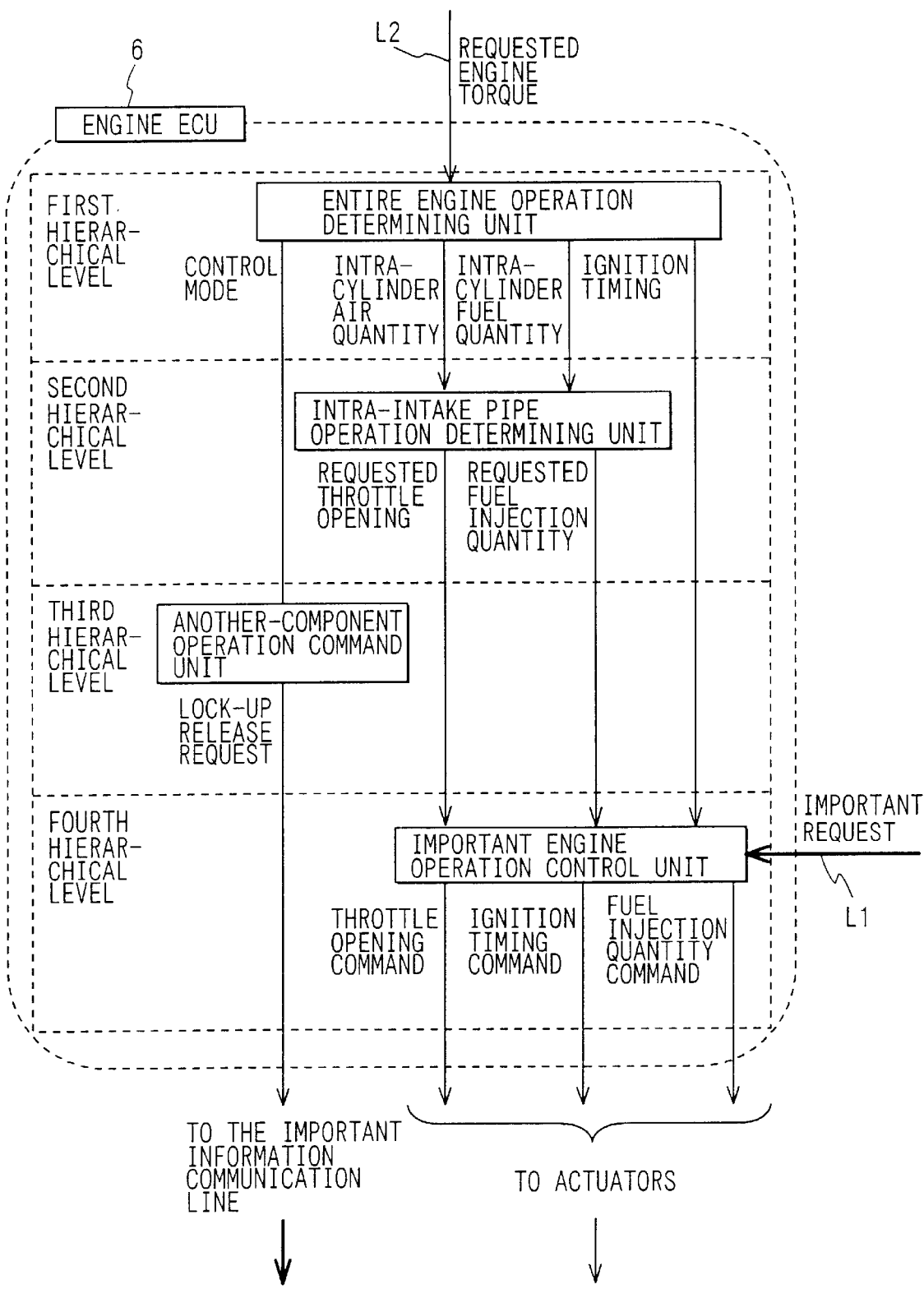
FIG. 3 is a block diagram showing a control processing executed for vehicle control by an engine ECU according to the invention.

FIG. 3 is a block diagram illustrating, in terms of functional blocks, a control processing executed in the engine ECU 6. As shown in the same figure, the control processing performed by the engine ECU 6 has a four-hierarchical level configuration and the general processing in the engine ECU is carried out mainly in the first and second hierarchical levels.

First, in an entire engine operation determining unit in the first hierarchical level there are set an intra-cylinder air quantity, an intra-cylinder fuel quantity, and an ignition timing for implementing the foregoing requested engine torque which has been input from the manager ECU 10 through the general information communication line L2.

More specifically, an intra-cylinder fuel quantity is set based on the requested engine torque, and an air-fuel ratio and an ignition timing are set based on both the number of revolutions of the engine and the amount of intake air. Then, the intra-cylinder fuel quantity thus set is multiplied by the air-fuel ratio to determine an intra-cylinder air quantity.

Subsequently, in an intra-intake pipe operation determining unit in the second hierarchical level, a throttle valve opening and a fuel injection quantity for implementing the above intra-cylinder fuel quantity are set as requested throttle opening and a requested fuel injection quantity, respectively, taking into account motions in the intake pipe such as the delay of air flow and the deposition of fuel in the pipe.

To be more specific, in establishing a requested throttle opening, a model reverse to a map for determining an intra-cylinder air quantity from the throttle opening is provided in advance and is referred to. At this time, a required throttle opening is determined based on the intra-cylinder air quantity and is set as a requested throttle opening.

In establishing a requested fuel injection volume, variations in the amount of fuel deposited in the intake pipe based on, for example, the amount of intake air and water temperature in the engine are determined with fuel injection volume as a parameter to prepare a map, which map is then referred to. Then, there is determined a fuel injection quantity such that the amount of fuel obtained by subtracting the fuel deposition quantity from the fuel injection quantity becomes equal to the foregoing intra-cylinder fuel quantity, and the fuel injection quantity thus determined is set as a requested fuel injection quantity.

The thus-set ignition timing, requested throttle opening, and requested fuel injection quantity are once input to an important engine operation control unit in the fourth hierarchical level.

Subsequently, in the important engine operation control unit in the fourth hierarchical level, if an important request (important information) for an important processing to be described later is not input through the important information communication line L1, control commands based on the above ignition timing, requested throttle opening, and requested fuel injection quantity are outputted respectively to the corresponding actuators.

In the above description, the entire engine operation determining unit and the intra-intake pipe operation determining unit correspond to the manipulated variable calculating means, while the important engine operation control unit corresponds to the control means.

Figure 4:
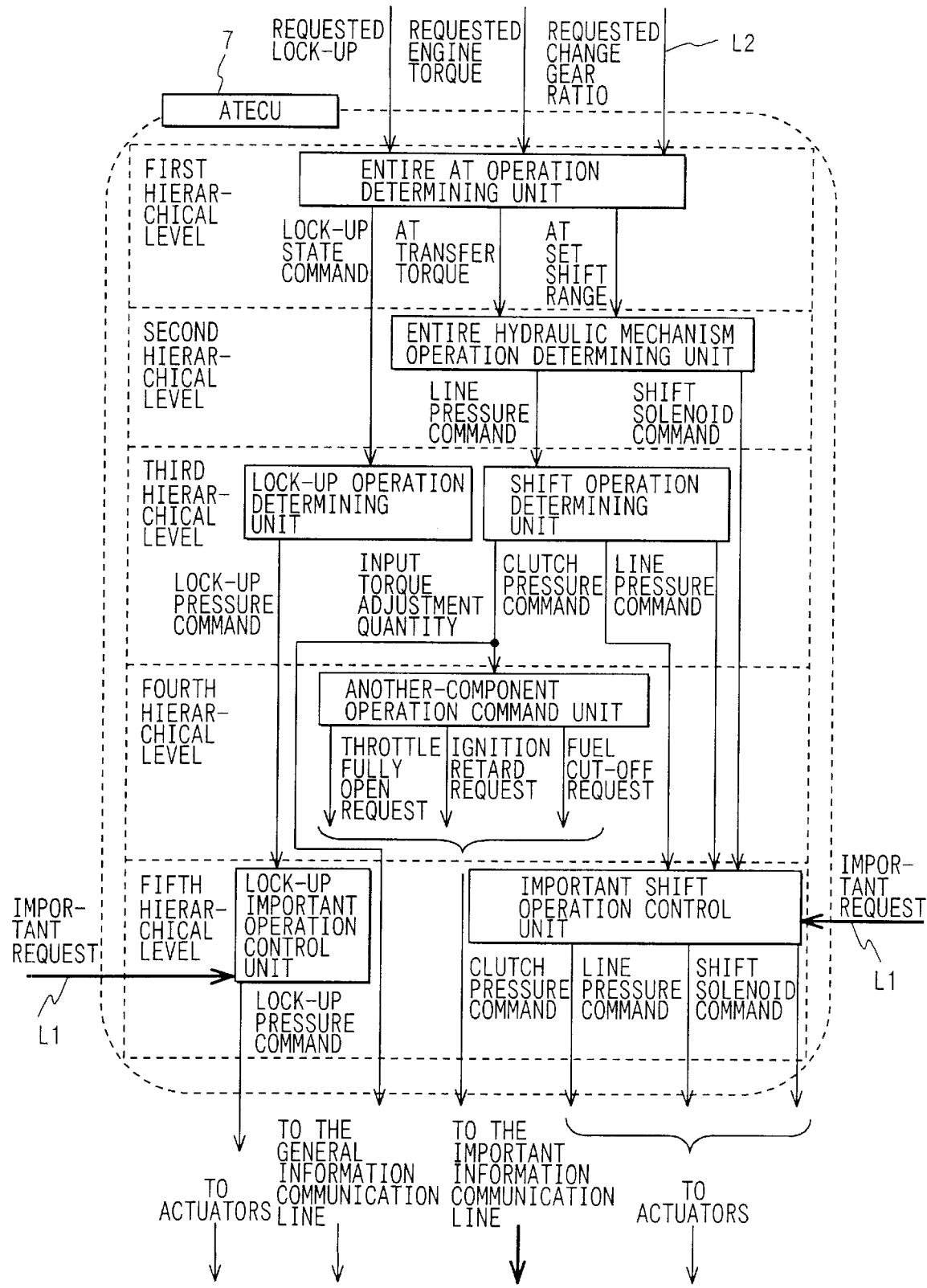
FIG. 4 is a block diagram showing a control processing executed for vehicle control by an ATECU according to the invention.

Next, a description will be given below about the general processing in ATECU 7. FIG. 4 is a block diagram showing, in terms of functional blocks, a control processing executed in ATECU 7. As shown in the same figure, the control processing performed by the ATECU 7 has a configuration of five hierarchical levels and the general processing thereof is carried out mainly in the first to third and the fourth hierarchical level.

First, in an entire AT operation determining unit in the first hierarchical level, an AT transfer torque, an AT set shift range, and a lock-up state command are set according to the foregoing requested engine torque, requested change gear ratio, and requested lock-up state state which have been inputted from the manager ECU 10 through the general information communication line L2.

More specifically, for implementing the requested change gear ratio, if it is necessary to newly execute a shift control, an AT set shift range is set taking an acceptable shift range into account according to the present state of the transmission. For example, since the AT 4 used in this embodiment is a multi-stage transmission, it is to be taken into account that another gear shift is not accepted during execution of one gear shift.

As to the lock-up state command, even if the foregoing requested lock-up state state requests turning ON the lock-up mechanism, the lock-up mechanism, as the case may be, cannot be turned ON. So, the lock-up state is turned ON or OFF taking such circumstances into account.

During gear shift, it is necessary to turn OFF the lock-up mechanism for preventing the occurrence of a shock. Therefore, even if the requested lock-up state state requests turning ON the lock-up mechanism, if a new gear shift is to be performed or if a gear shift is being made at present, the lock-up state command is set to lock-up state OFF, while in other cases the lock-up state command is set to lock-up state ON.

Further, since the magnitude of torque to be transferred by the multi-stage transmission depends on engine torque, lock-up state, and change gear ratio, an AT transfer torque is set based on these factors.

More particularly, for the requested engine torque, a torque amplification ratio of the torque converter corresponding to the lock-up state and a change gear ratio corresponding to the AT set shift range are multiplied and the value obtained is set as an AT transfer torque.

Then, in an entire hydraulic mechanism operation determining unit in the second hierarchical level, upon receipt of the result obtained in the first hierarchical level, a line pressure command as a main pressure for AT control and a shift solenoid command are set. In this case, AT shift ranges are switched from one to another by turning ON or OFF of the shift solenoid. So regarding the shift solenoid command, a shift solenoid ON/OFF command is set to implement the AT set shift range which is the result obtained in the first hierarchical range. Moreover, since the torque capable of being transferred by AT depends on the magnitude of the line pressure, there is set such a line pressure command as permits positive transfer of the AT transfer torque. More specifically, this line pressure is calculated from a line pressure command map corresponding to AT transfer torques which have been preset shift range by shift range so as not to permit slipping of each clutch installed in the interior of AT 4.

Subsequently, in a lock-up operation determining unit in the third hierarchical level, an arithmetic operation of a manipulated variable in the lock-up processing is executed, while in a shift operation determining unit, an arithmetic operation of a manipulated variable in the shift control is executed.

In the lock-up operation determining unit, lock-up clutch pressure is commanded so that the lock-up state switches over gradually to prevent the occurrence of a shock against the vehicle in case of switch over from one to another lock-up state command. More specifically, it is assumed that a maximum state of clamp pressure of the lock-up clutch is a complete lock-up ON state and a minimum state thereof is a complete lock-up OFF state, and in case of the lock-up state command being ON and the lock-up state being a complete lock-up ON state, or in case of the lock-up state command being OFF and the lock-up state being a complete lock-up OFF state, the clamp pressure of the lock-up clutch is maintained as it is. On the other hand, in case of the lock-up state command being ON and the lock-up state being not a complete lock-up ON state, or in case of the lock-up state command being OFF and the lock-up state being not a complete lock-up OFF state, the clamp pressure of the lock-up clutch is increased or decreased with a predetermined gradient.

In the shift operation determining unit, a clutch pressure command and an input torque adjustment quantity are calculated for preventing the occurrence of an abnormal shift shock or clutch seizure at the time of gear shift.

To be more specific, from the standpoint of suppressing a shift shock it is desirable that the time required for shifting operation be long. But, from the standpoint of preventing seizure of the clutch, the required time is preferably short. Therefore, a clutch pressure command is set so that a shifting operation is carried out within a tolerance between the two. Command values of this clutch pressure are preset in a map correspondingly to AT transfer torques and vehicle speeds.

However, during high vehicle speeds, there sometimes occurs a case where it is impossible to set time within the tolerance from the standpoint of suppressing a shift shock and preventing seizure of the clutch. In this case, there is performed a processing to set an input torque adjustment quantity to decrease the engine torque and thereby diminish the AT transfer torque. Since this reduction of the engine torque is performed according to a command issued from the manager ECU 10 to the engine ECU 6, a required engine torque decrease quantity is set as an input torque adjustment quantity for the manager ECU 10 and is transmitted to the manager ECU through the general information communication line L2. These set values are preset as a map correspondingly to vehicle speeds.

On the other hand, the foregoing shift solenoid command, line pressure command, and clutch pressure command are once input to an important shift operation control unit in the fifth hierarchical level, while the foregoing lock-up pressure command is once input to an important lock-up operation control unit in the fifth hierarchical level.

Then, in the important shift operation control unit and the important lock-up operation control unit, if an important request (important information) for an important processing to be described later is not input through the important information communication line L1, the shift solenoid command, line pressure command, clutch pressure command, and lock-up pressure command are output as they are to the corresponding actuators.

In the above description, the entire AT operation determining unit, entire hydraulic mechanism operation determining unit, lock-up operation determining unit, shift operation determining unit correspond to the manipulated variable calculating means, while the important shift operation control unit and the important lock-up operation control unit correspond to the control means.

Figure 5:
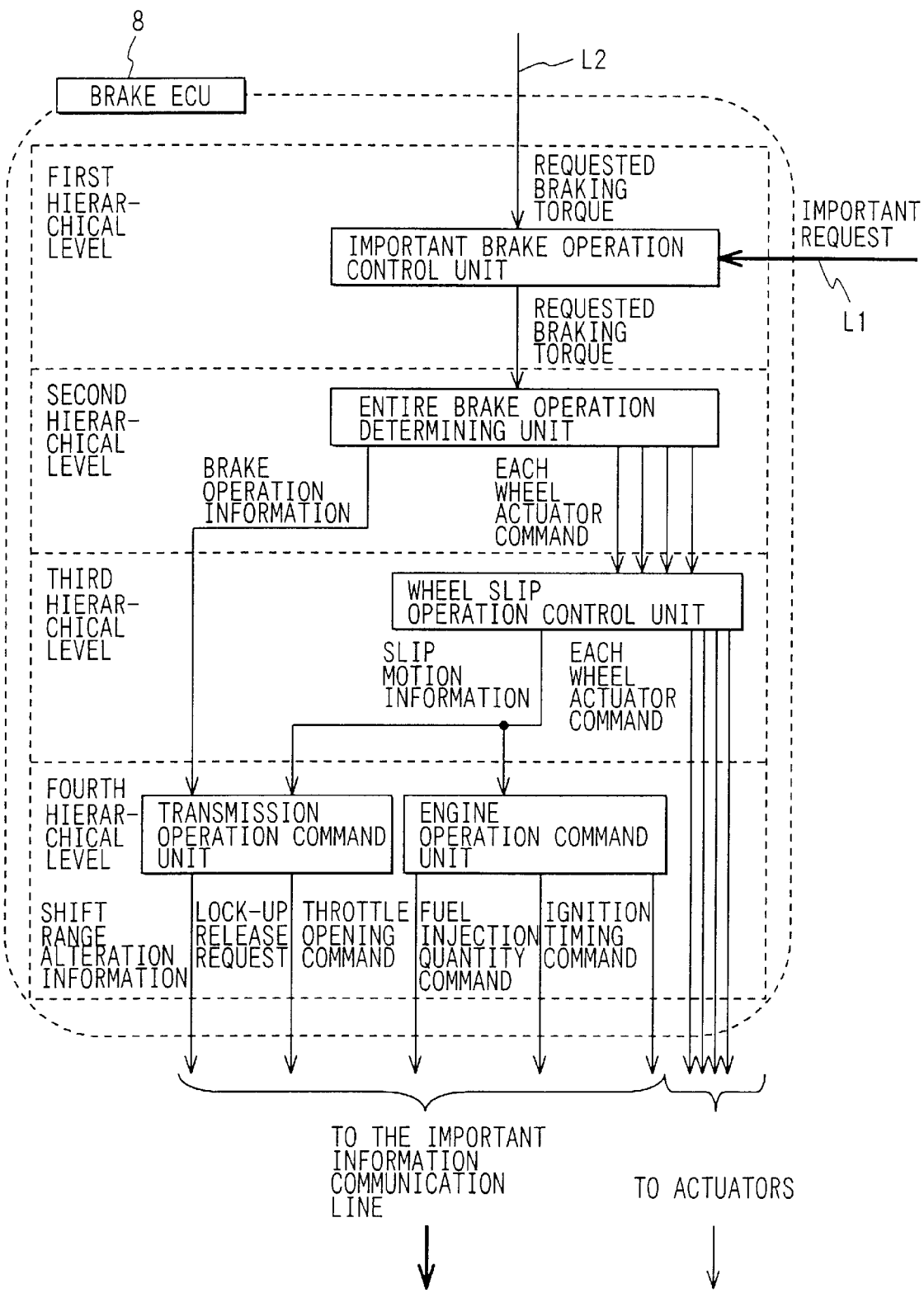
FIG. 5 is a block diagram showing a control processing executed for vehicle control by a brake ECU according to the invention.
Figure 6:
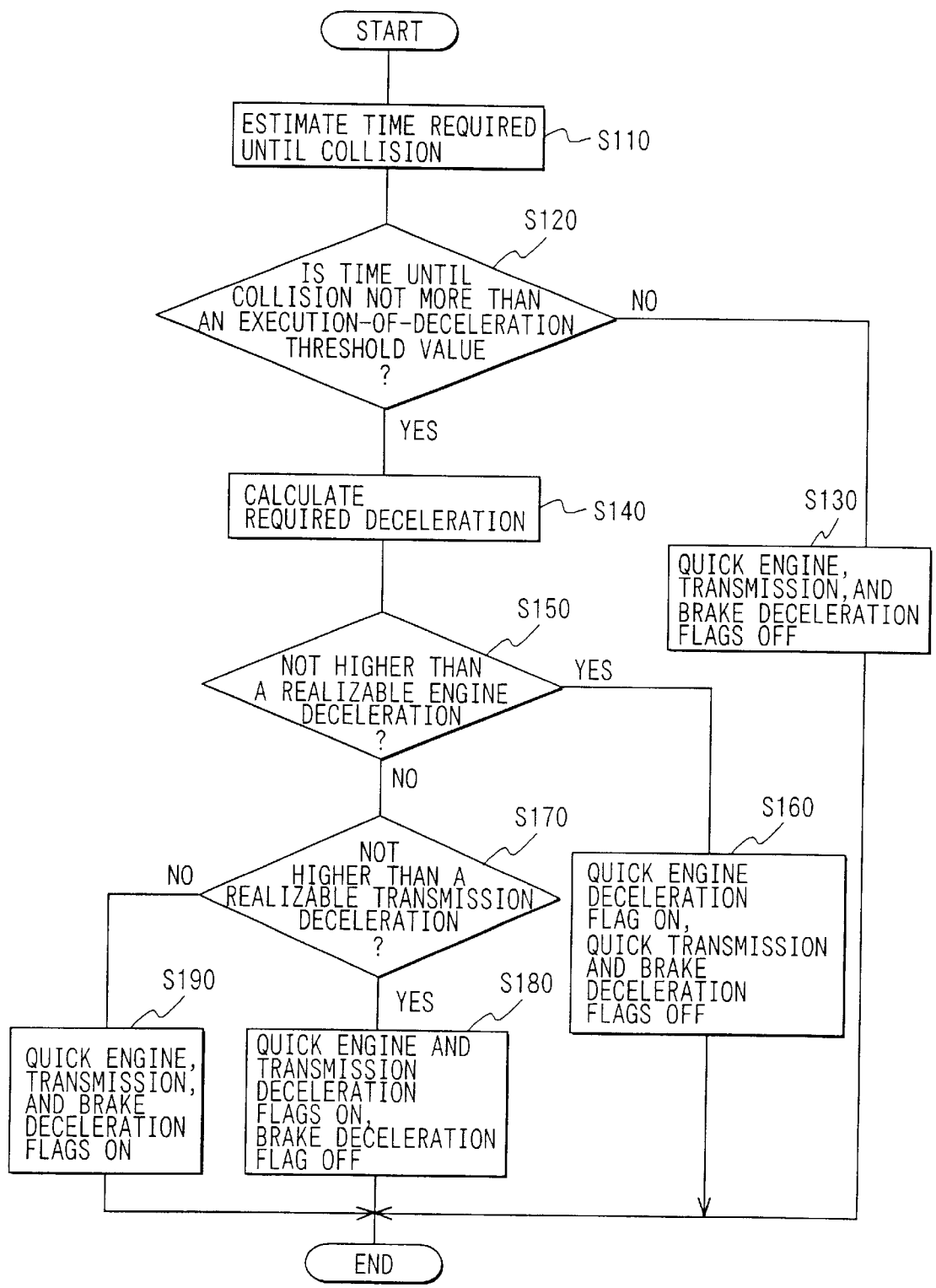
FIG. 6 is a flow chart showing an important processing executed by the manager ECU according to the invention.
Figure 7:
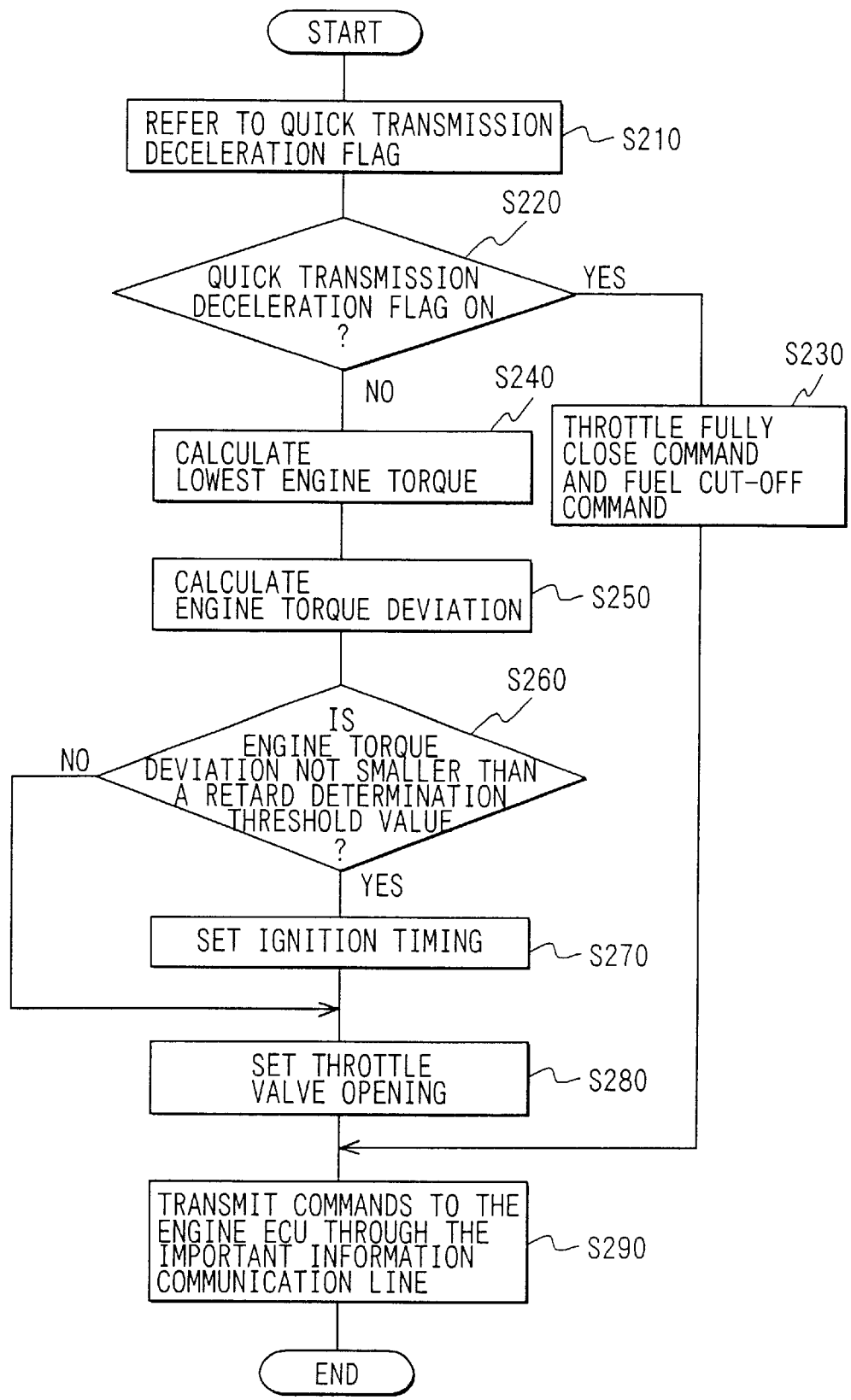
FIG. 7 is a flow chart showing an important processing executed by an engine manipulated variable calculating unit in the manager ECU according to the invention.
Figure 11:
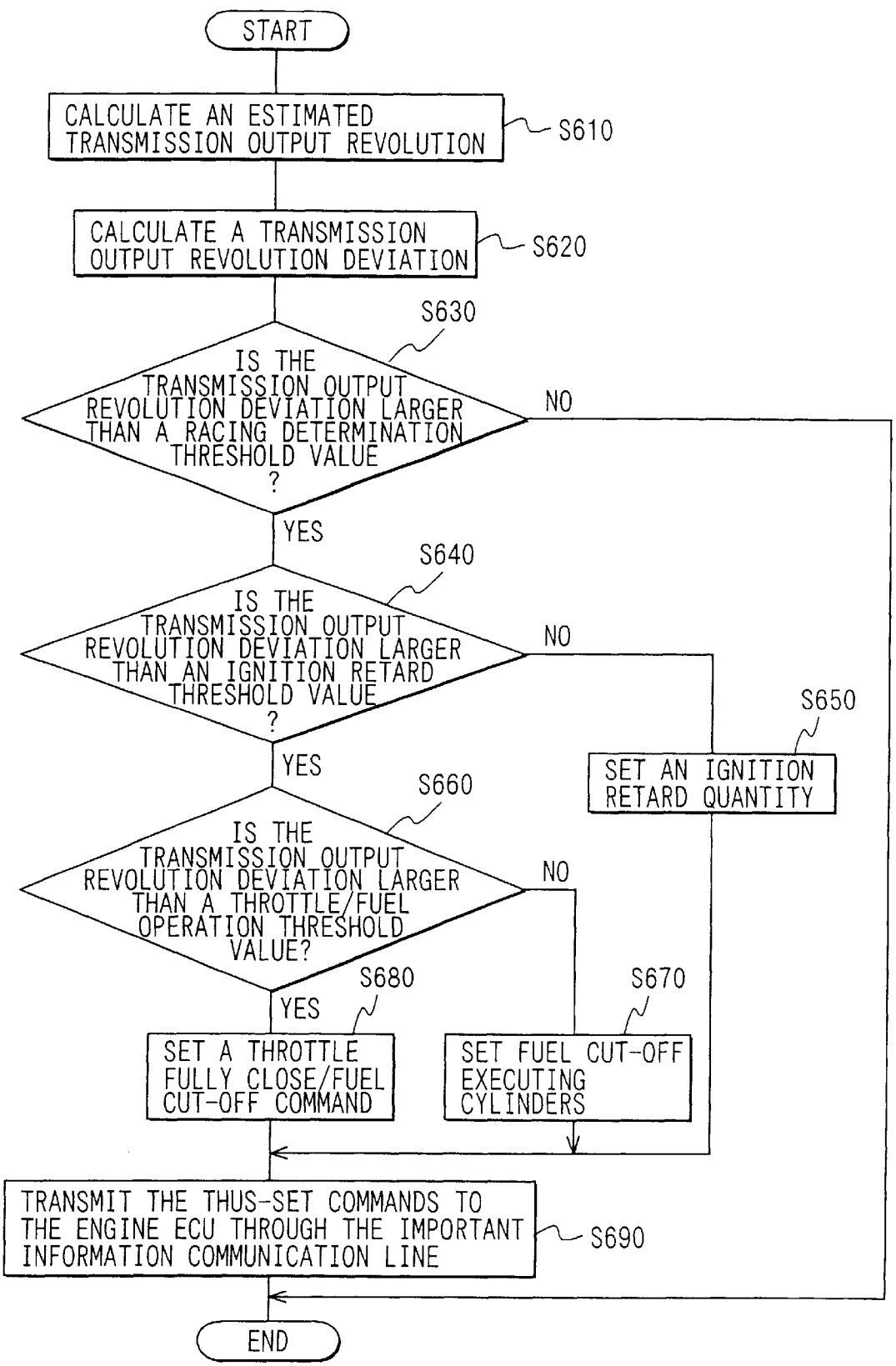
FIG. 11 is a flow chart showing an important processing which requests another ECU for operation in the ATECU according to the invention.

The following description is now provided about the general processing in the brake ECU 8. FIG. 5 is a block diagram showing, in terms of functional blocks, a control processing executed in the brake ECU 8. As shown in the same figure, the control processing in the brake ECU 8 has a configuration of four hierarchical levels and the general processing thereof is executed mainly in the second and third hierarchical levels.

First, if an important request (important information) for an important processing to be described later is not inputted to an important brake operation control unit in the first hierarchical level through the important information communication line L1, the foregoing requested braking torque which has been input from the manager ECU 10 through the general information communication line L2 is input as it is to an entire brake operation control unit in the second hierarchical level. Then, for the requested braking torque, a brake oil pressure required for each of the wheels (four wheels) is set in an entire brake operation determining unit.

More particularly, in the entire brake operation determining unit, the requested braking torque is converted to a command for the solenoid which adjusts the brake oil pressure. Subsequently, in a wheel slip operation control unit in the third hierarchical level, there are executed operations of an anti-lock mechanism and of brake traction. To be more specific, when tire lock or wheel spin is detected during travel of the vehicle, the brake pressure is increased or decreased to eliminate such a condition. Particularly, in the event of brake traction, the solenoid temperature is estimated based on a brake actuation time, and if it is determined that there is a fear of disconnection caused by heating, a Brake Traction Inhibit Flag is turned ON. A brake oil pressure command for each wheel determined at this time is outputted to an actuator (solenoid).

In the above description, the entire brake operation determining unit corresponds to the controlled valuable calculating means, while the wheel slip operation control unit corresponds to the control means. Next, a description will be given below about important processings with reference to the flow charts of FIGS. 2 to 5 and FIGS. 6 to 21. There are two types of important processings, in one of which an operation request (important information) for another ECU is transmitted and in the other of which an operation request (important information) from another ECU is received and control is executed.

Reference will first be made below to an important processing executed in the manager ECU 10. As shown in FIG. 2, an important processing in the manager ECU 10 is only calculating an operation request for another ECU, which is executed in the first and fourth hierarchical levels. The following description will refer to ACC control as an example.

In the entire vehicle operation determining unit in the first hierarchical level, operation guides for the engine 2, transmission 4 and brakes 5 are set according to the danger of collision with a front vehicle. This processing is illustrated in the flow chart of FIG. 6.

First, the time required until collision is estimated based on a vehicle-to-vehicle distance and a relative speed between the vehicle in question and the front vehicle which are inputted from the radar sensor 9 through the communication line L' (S110). The time is the time required until the vehicle-to-vehicle distance becomes zero if both vehicles continue to run at this relative speed. It is calculated by dividing the vehicle-to-vehicle distance by the relative speed.

Next, a check is made to see whether the time required until collision is not more than an execution-of-deceleration threshold value (S120). The execution-of-deceleration threshold value is preset as an index of determining whether deceleration is necessary or not, and it is for determining that the danger of collision is high and deceleration is needed if the time required until collision is below the execution-of-deceleration threshold value. More particularly, this determination is made with reference to a map in which execution-of-deceleration threshold values are preset according to relative speeds and distances between this vehicle and a front vehicle. The execution-of-deceleration threshold value is set so as to be large when a relative speed is high (the speed of this vehicle is higher than the front vehicle and the difference in speed between the two is large) and when the vehicle-to-vehicle distance is short.

If the time required until collision is determined to be longer than the execution-of-deceleration threshold value (NO in S120), it is determined that the danger of collision is low and that therefore urgent deceleration is not necessary, and all of preset flags, which are Quick Engine Deceleration Flag, Quick Transmission Deceleration Flag, and Quick Brake Deceleration Flag, are turned OFF and the processing is terminated (S130). In this case, therefore, deceleration control is not performed.

On the other hand, if the time required until collision is determined to be not more than the execution-of-deceleration threshold value (YES in S120), it is determined that urgent deceleration is needed, and a required deceleration is calculated (S140). The required deceleration is set according to the difference between the time required until collision and the execution-of-deceleration threshold value.

Then, the required deceleration and a realizable engine deceleration are compared with each other and a check is made to see if the required deceleration is not higher than the realizable engine deceleration (S150). The realizable engine deceleration means a deceleration capable of being realized by engine control when the transmission shift range is set to the highest side at the current vehicle speed, i.e., a deceleration capable of being realized by adjusting the throttle opening, ignition timing and fuel injection quantity.

If the required deceleration is determined to be not higher than the realizable engine deceleration (YES in S150), it is determined that deceleration can be made by only engine control and Quick Engine Deceleration Flag is turned ON, while Quick Transmission Deceleration Flag and Quick Brake Deceleration Flag are turned OFF (S160). In this case, therefore, deceleration is performed by only engine control. Thus, the shock which occurs in the vehicle is suppressed relatively small.

On the other hand, if the required deceleration is determined to be higher than the realizable engine deceleration in S150 (NO in S150), it is determined that a desired deceleration is not attained by engine control alone, then the required deceleration is compared with a realizable transmission deceleration and a check is made to see if the required deceleration is not higher than the realizable transmission deceleration (S170). The realizable transmission deceleration means a deceleration capable of being realized when the lowest shift range is set among shift ranges capable of being executed at various vehicle speeds which are set in a range not causing over-revolution of the engine.

If the required deceleration is determined to be lower than the realizable transmission deceleration (YES in S170), it is determined that deceleration can be made by both engine control and transmission control, and Quick Engine Deceleration Flag and Quick Transmission Deceleration Flag are turned ON, while Quick Brake Deceleration Flag is turned OFF (S180). In this case, therefore, deceleration is performed by both engine control and transmission control. Thus, as a result of switching between shift ranges, it is presumed that the shock which occurs in the vehicle will be somewhat larger than in engine control alone.

On the other hand, if the required deceleration is determined to be higher than the realizable transmission deceleration (NO in S170), it is determined that the desired deceleration will not be attained by only engine control and transmission control, and deceleration by brake control is added. That is, all of Quick Engine Deceleration Flag, Quick Transmission Deceleration Flag, and Quick Brake Deceleration Flag are turned ON (S190). In this case, therefore, the vehicle may undergo a relatively large shock caused by operation of the brakes 5. But such a shock is regarded as being inevitable for avoiding the occurrence of collision.

Once operation guides for the engine 2, transmission 4 and brakes 5 are thus set in the first hierarchical level, the set information pieces are directly sent respectively to the engine manipulated variable calculating unit, transmission manipulated variable calculating unit, and brake manipulated variable calculating unit in the fourth hierarchical level.

In the fourth hierarchical level, independent processings are executed in the engine controlled valuable calculating unit, transmission manipulated variable calculating unit, and brake manipulated variable calculating unit.

Reference will first be made to the processing in the engine manipulated variable calculating unit.

The processing in the engine manipulated variable calculating unit is executed when the foregoing Quick Engine Deceleration Flag is ON, and there are determined throttle opening, ignition timing and fuel injection quantity in such a manner as to realize the required deceleration. This processing is shown in the flow chart of FIG. 7.

First, reference is made to the foregoing Quick Transmission Deceleration Flag (S210) and a check is made to see if the same flag is ON or not (S220).

If Quick Transmission Deceleration Flag is determined to be ON (YES in S220), since the realizable engine deceleration is not higher than the required deceleration, it is determined that it is necessary to zeroise the driving force of the engine so as to effect deceleration in a possible range as an immediate measure. Based on this determination, a throttle fully close command and a fuel cut-off command are outputted (S230) to the engine ECU 6 through the important information communication line L1.

On the other hand, if Quick Transmission Deceleration Flag is determined to be OFF (NO in S22), since the realizable engine deceleration is higher than the required deceleration, it is determined that it is necessary to concretely calculate a manipulated variable for the reduction of torque by engine control, and a minimum engine torque is calculated first (S240). The minimum engine torque means an engine torque which is realized when the throttle valve is fully closed and the supply of fuel is cut off in the current engine speed, and it is calculated from a map which is preset with engine speed as a parameter.

Then, an engine torque deviation is calculated which deviation is the difference between the minimum engine torque and the requested engine torque which has been set by the foregoing general processing (S250). This engine torque deviation is compared with a retard determination threshold value and a check is made to see whether the engine torque deviation is not smaller than the retard determination threshold value (S260). The engine torque deviation represents how much torque reduction is to be realized from the engine torque in general processing, in engine control in important processing at the time of switching of the vehicle control from general processing to important processing. As to the retard determination threshold value, it is an index preset for determining whether a torque reduction based on ignition timing retard control is to be executed or not at the time of torque reduction corresponding to the engine torque deviation.

If the engine torque deviation is determined to be smaller than the retard determination threshold value (NO in S260), it is determined that it is not necessary to control the ignition timing to the retard side for the reduction of engine torque, and the processing flow shifts to S280. The reason why the ignition timing is not so controlled is because the torque reduction control, which should be carried out in a decreased fuel injection quantity according to the fuel injection quantity control for example, is performed in the same fuel injection quantity and this is not desirable from the standpoint of fuel economy. On the other hand, if it is determined in S260 that the engine torque deviation is not smaller than the retard determination threshold value (YES in S260), the ignition timing is set to the retard side for diminishing the engine torque (S270). The ignition timing is determined by reference to a map of ignition retard quantities preset with engine torque deviation as parameter. This ignition retard control is executed for ensuring an initial deceleration response. Since the engine torque deviation becomes smaller as the required engine torque in general processing decreases, a return is made to the original ignition timing by the above processing.

Next, a throttle opening for realizing the required deceleration is set (S280). This is calculated from a map of throttle valve openings preset according to engine speeds and required decelerations.

Commands indicative of manipulated variables of throttle opening, ignition timing and fuel injection quantity calculated by the above processing are transmitted to the engine ECU 6 through the important information communication line L1. Of the above three manipulated variables, as to one which has not been set, it is determined on the manager ECU 10 side that its setting is not specially necessary, and an appropriate value is set in the engine ECU.

Next, the processing performed in the transmission manipulated variable calculating unit will be described below.

The processing in the transmission manipulated variable calculating unit is executed when the foregoing Quick Transmission Deceleration Flag is ON. In this processing, which is shown in the flow chart of FIG. 8, a requested change gear ratio and a requested lock-up state state are determined so as to realize the required the required deceleration.

First, a current realizable deceleration capable of being realized in a throttle valve fully closed and fuel cut-off condition is calculated (S300). The current realizable deceleration represents the magnitude of deceleration capable of being realized by only engine deceleration at the present change gear ratio and in lock-up condition. It is set according to the change gear ratio, lock-up state and vehicle speed.

Subsequently, a transmission deceleration deviation as the difference between the current realizable deceleration and the required deceleration is calculated (S310) and the magnitude thereof is determined (S320).

If the transmission deceleration deviation is determined to be above zero, that is, if the required deceleration is determined to be smaller than the current realizable deceleration (NO in S320), it is determined that the required deceleration can be realized by only deceleration in the engine, and the processing is terminated.

On the other hand, if the transmission deceleration is determined to be below zero, that is, if the current realizable deceleration is determined to be not higher than the required deceleration in S320 (YES in S320), it is determined necessary to concretely calculate a manipulated variable for the reduction of torque by shift control. Then, a change gear ratio capable of being set in a range not causing over-revolution relative to the current requested change gear ratio obtained by general processing just before is set in a lock-up OFF state and a deceleration at the change gear ratio thus set is estimated for each shift range and is calculated as an estimated transmission deceleration (S330). The estimated transmission deceleration is obtained by reference to a deceleration map preset according to change gear ratios, lock-up states, and vehicle speeds.

The shift range and lock-up state which realize the estimated transmission deceleration are set as a requested change gear ratio and a requested lock-up state state, respectively, (S340), which are transmitted to the ATECU 7 through the important information communication line L1 (S350).

Description will now be directed to the processing which is carried out in the brake manipulated variable calculating unit.

The processing in the brake manipulated variable calculating unit is executed when the foregoing Quick Brake Deceleration Flag is ON, and a required braking torque is determined so as to realize the required deceleration. This processing is shown in the flow chart of FIG. 9.

First, a braking torque for realizing the required deceleration is calculated by reference to a braking torque map which has been preset according to vehicle speeds and required decelerations (S410).

Next, a comparison is made between this braking torque and the current requested braking torque obtained by general processing just before and the larger one is set as a required braking torque (S420), which is transmitted to the brake ECU 8 through the important information communication line L1 (S430).

In the above description, the engine manipulated variable calculating unit, the transmission manipulated variable calculating unit, and the brake manipulated variable calculating unit correspond to the manipulated variable calculating means, and the function of determining an operation guide in the entire vehicle operation determining unit, further calculating independent manipulated variables in the engine manipulated variable calculating unit, the transmission manipulated variable calculating unit, and the brake manipulated variable calculating unit, respectively, and transmitting them through the important information communication line L1 corresponds to the function of the second important information transmitting means.

Next, a description will be given below about an important processing in which an operation for another ECU is requested in the engine ECU 6. This important processing is executed mainly in the third hierarchical level shown in FIG. 3 and according to the flow chart shown in FIG. 10.

Reference will here made to an example of processing in which the lock-up state is turned OFF urgently for only a short period which follows mode switching in order to suppress the occurrence of a vehicular shock caused by a sudden change in engine torque at the time of combustion mode switching.

First, according to information which has been inputted to the another-component operation command unit in the third hierarchical level through the general information communication line L2 and further through the entire engine operation determining unit in the first hierarchical level, and by reference to air-fuel ratios in a past, predetermined time period in general processing, a check is made to see how combustion mode has changed.

Then, it is determined whether there has been made from one to another combustion mode in the past, predetermined time period, that is, whether there has been made switching between a homogeneous combustion mode in which the air-fuel ratio is near the stoichiometric air-fuel ratio or fuel concentration is richer than the stoichiometric ratio and a stratified charge combustion mode in which fuel concentration is leaner than the stoichiometric ratio (S510). An appropriate value in the past, predetermined time period is preset based on the length of a sudden change-of-torque period.

If it is determined that there has been made no switching of combustion mode (NO in S510), it is determined that there will not occur any vehicular shock, and the processing is terminated.

On the other hand, if it is determined that there has been made switching of combustion mode (YES in S510), a lock-up OFF request for suppressing a vehicular shock is set (S520) and this request is sent to ATECU 7 through the important information communication line L1.

In the above description, the function of setting the lock-up OFF request through a predetermined processing performed by the another-component operation command unit and sending it to ATECU 7 through important information communication line L1 corresponds to the function as the important information transmitting means.

The following description is now provided about an important processing in which an operation for another ECU is requested in ATECU 7. This processing is executed mainly in the fourth hierarchical level in FIG. 4 and according to the flow chart of FIG. 11.

Reference will here made to an example of processing which is carried out for getting out of an excessively slipping state of the clutch in AT 4 (i.e., an engine racing state) for some reason.

First, an estimated transmission output revolution is calculated based on information which has been inputted to the another-component operation command unit in the fourth hierarchical level through the shift operation determining unit in the third hierarchical level in FIG. 4 (S610). This estimated transmission output revolution is obtained by multiplying the transmission input revolution by a change gear ratio corresponding to a shift range large in change gear ratio before and after gear shift if the gear shift is being conducted or by a change gear ratio of the current shift range if gear shift is not being conducted.

Next, a transmission output revolution deviation, which is the difference between the estimated transmission output revolution and the actual transmission output revolution, is calculated (S620) and a check is made to see if the deviation is larger than a racing determination threshold value or not (S630). The racing determination threshold value is an index for determining whether the engine is in a racing condition or not.

If the transmission output revolution deviation is not larger than the racing determination threshold value (NO in S630), it is determined that the engine is not racing, causing no problem, and the processing is terminated.

On the other hand, if the transmission output revolution deviation is determined to be larger than the racing determination threshold value in S630 (YES in S630), it is determined that the engine is racing, and an appropriate measure is taken.

First, the transmission output revolution deviation is compared with an ignition retard threshold value and a check is made to see if the former is larger than the latter (S640). The ignition retard threshold value is an index preset for determining whether a torque reduction control based on an ignition timing retard control is to be executed or not at the time of decreasing the engine torque for getting out of the engine racing condition.

If the transmission output revolution deviation is determined to be not larger than the ignition retard threshold value (NO in S640), an appropriate ignition retard quantity is set (S650). In this case, it is determined that the engine is in a light racing condition and that a return to the normal condition can be done in a short period of time, and a measure is taken to diminish torque by retarding ignition so that the engine may not assume a heavy racing condition. The ignition retard quantity is set by creating an engine racing condition in an actual vehicular traveling test and obtaining an appropriate value. The same value is used in the whole region of travel.

Then, the transmission output revolution deviation is compared with a throttle/fuel operation threshold value and a check is made to see if the former is larger than the latter (S660). The throttle/fuel operation threshold value is an index preset for determining whether the driving torque should be completely dropped by throttle opening control or by fuel injection control at the time of decreasing the driving torque for getting out of the engine racing condition.

If the transmission output revolution deviation is determined to be not larger than the throttle/fuel operation threshold value (NO in S660), there is made setting to execute a fuel cut-off operation in half of all the cylinders (S670). In this case, it is determined that the engine is in a medium degree of racing condition and that a return to the original normal condition can be done even without dropping the driving torque completely, and a fuel cut-off operation is carried out in half of all the cylinders to prevent the engine from coming into a heavy racing condition.

On the other hand, if it is determined in S660 that the transmission output revolution deviation is larger than the throttle/fuel operation threshold value (YES in S660), a throttle fully close/fuel cut-off command is set (S680). In this case, it is determined that the engine is a heavy racing condition and that a return to the normal condition under the generation of torque is impossible, and the throttle valve is fully closed and the supply of fuel is cut off to stop the generation of engine torque.

Then, the command information thus set is outputted to the engine ECU 6 through the important information communication lineL1 (S690).

In the above description, the function of performing predetermined arithmetic operations by the another-component operation command unit and transmitting manipulated variables as the results of the arithmetic operations to the engine ECU 6 through the important information communication line L1 corresponds to the function of the important information transmitting means.

A description will now be given about an important processing in which an operation for another ECU is requested in the brake ECU 8. This is executed mainly in the fourth hierarchical level in FIG. 1. Examples of the processing are shown in the flow charts of FIGS. 12 and 13 with respect to operation requests to the transmission and the engine, respectively.

Figure 12:
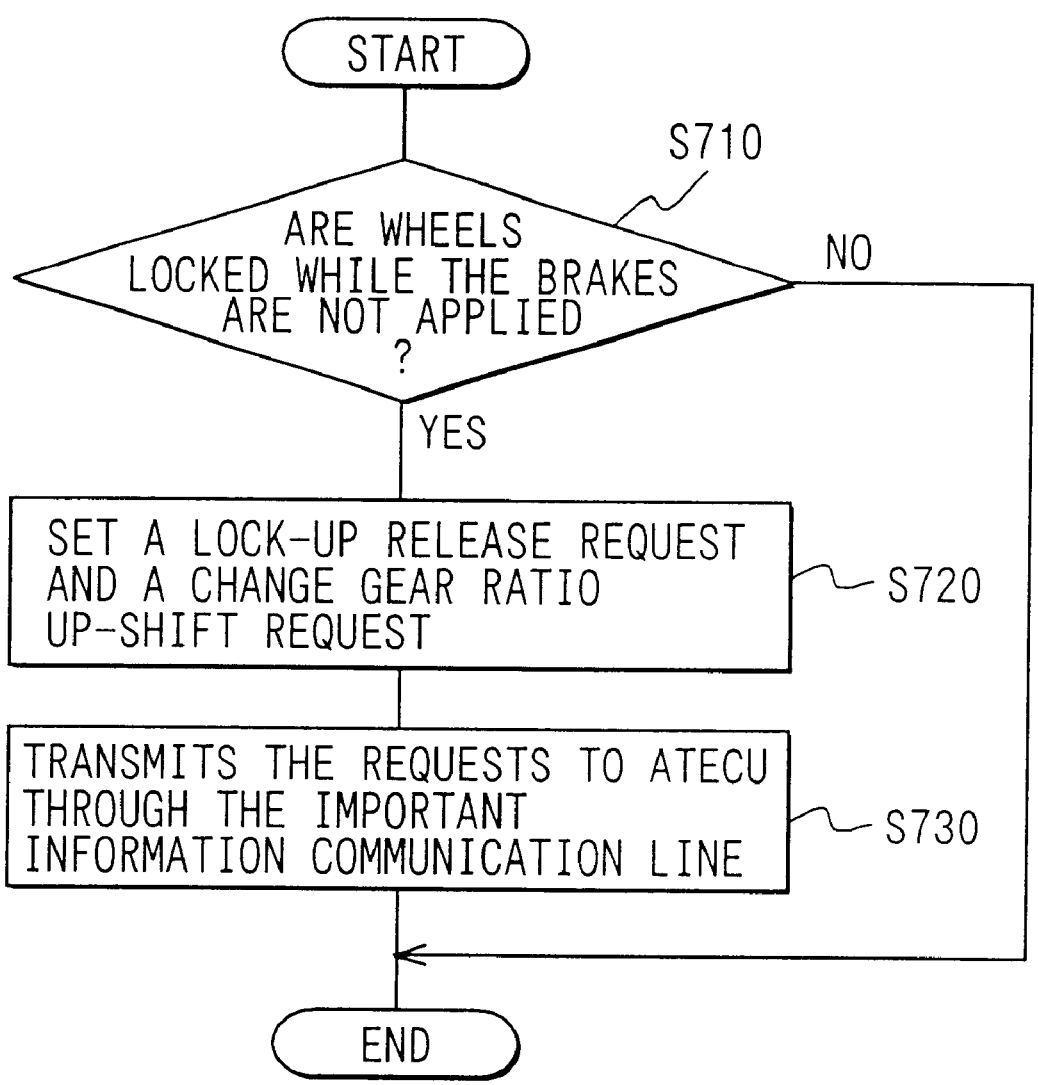
FIG. 12 is a flow chart showing an important processing which requests another ECU for operation in the brake ECU according to the invention.
Figure 13:
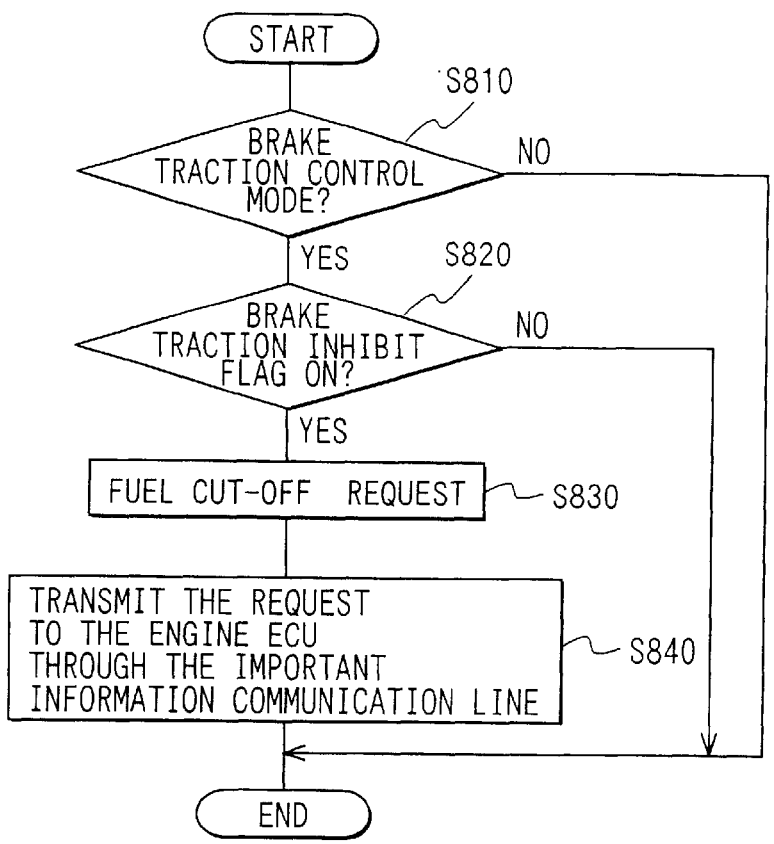
FIG. 13 is a flow chart showing an important processing which requests another ECU for operation in the brake ECU according to the invention.
Figure 14:
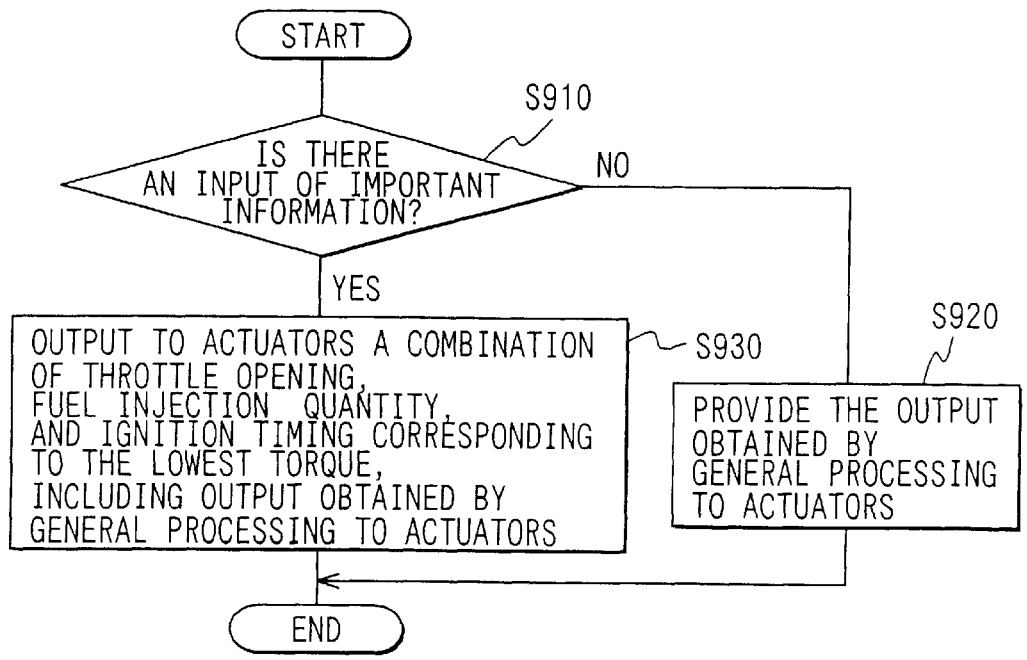
FIG. 14 is a flow chart showing an important processing which the engine ECU executes according to a command received from another ECU according to the invention.

First, an operation request to the transmission will be described with reference to FIG. 12. Reference will here be made to an example of processing which is carried out for getting out of a locked state of wheels by engine brake despite the brakes being not actuated.

A check is made to see if the wheels are locked or not despite the brakes being not actuated, based on information inputted to the shift operation command unit in the fourth hierarchical level through the entire brake operation determining unit in the second hierarchical level in FIG. 5 and also based on wheel speeds. If it is determined that the wheels are not locked (NO in S710), the processing is terminated.

On the other hand, if the wheels are determined to be locked (YES in S710), it is determined that the wheels are locked by engine brake, and there are set a lock-up release request and a change gear ratio up-shift request (S720), which requests are then sent to ATECU 7 through the important information communication line L1 (S730).

A description will be given below about an operation request to the engine.

Reference will here made to an example of processing which is carried out for stopping the vehicle while keeping the brakes out of operation in the case where the brakes are hot and does not operate normally.

First, it is determined whether the brakes are now in the brake traction control mode or not based on information which has been inputted to the engine operation command unit in the fourth hierarchical level through the entire brake operation determining unit in the second hierarchical level in FIG. 5 (S810), and if the result is negative (NO in S810), the processing is ended.

On the other hand, if the result is affirmative in S810 (YES in S810), a check is made to see if Brake Traction Inhibit Flag which has been set in advance is ON or not (S820), and if the same flag is determined to be OFF (NO in S820), the processing is ended.

On the other hand, if it is determined that Brake Traction Inhibit Flat is ON (YES in S820), there is set a fuel cut-off request (S830) and this request is sent to the engine ECU 6 through the important information communication line L1 (S840).

In the above description, the function of performing predetermined arithmetic operations by the transmission operation command unit and the engine operation command unit and transmitting manipulated variables as the results of the arithmetic operations to ATECU 7 and engine ECU 6 through the important information communication line L1 corresponds to the function of the important information transmitting means.

Reference will now be made below to an important processing which each ECU executes upon receipt of a command from another ECU. This important processing is executed in each of engine ECU 6, ATECU 7, and brake ECU 8.

Description is directed first to the processing in engine ECU 6. The processing in engine ECU 6 is carried out in the fourth hierarchical level in FIG. 3 according to the procedure shown in the flow chart of FIG. 14.

First, a check is made to see if there is an input from another ECU (manager ECU 10, ATECU 7, or brake ECU 8) to the engine important operation control unit in the fourth hierarchical level through the important information communication line L1 (S910). If the result is negative (NO in S910), requests of throttle opening, fuel injection quantity and ignition timing are outputted to actuators (S920).

On the other hand, if it is determined that there is an input of important information (YES in S910), since it is understood that this input is information calling for the reduction of torque, there is established, as a command, a combination of throttle opening, fuel injection quantity and ignition timing, which would lie on the safest side, that is, would give the lowest engine torque, from among requested outputs obtained by general information and important information pieces provided from manager ECU 10, ATECU 7 and brake ECU 8, and the command is outputted to actuators (S930).

Next, reference will be made to the processing in ATECU 7. The processing in ATECU 7 is executed in the fifth hierarchical level in FIG. 4. In connection with this processing, the procedure of important lock-up operation and that of important shift operation are shown in the flow charts of FIGS. 15 and 16, respectively.

Figure 15:
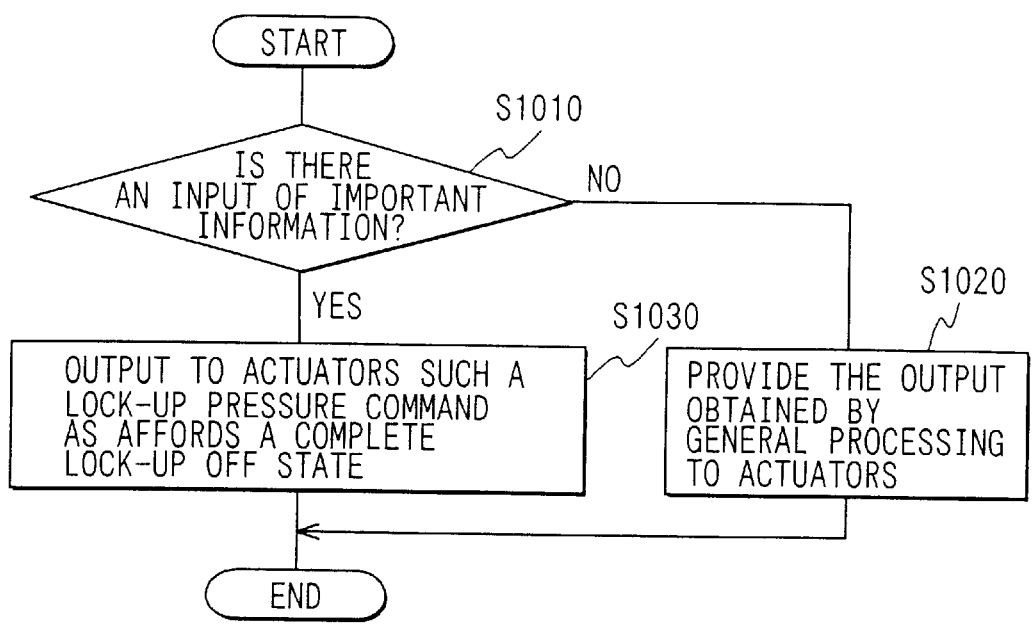
FIG. 15 is a flow chart showing an important processing which the ATECU executes according to a command received from another ECU according to the invention.

First, the processing on important lock-up operation is carried out in the important lock-up operation control unit in fifth hierarchical level in FIG. 4. First, as shown in FIG. 15, a check is made to see if there is an input of important information to the important lock-up operation control unit from another ECU (manager ECU 10, engine ECU 6, or brake ECU 8) through the important information communication line L1 (S1010). If the result is negative (NO in S1010), a lock-up pressure command obtained by general processing is outputted as it is to actuators (S1020).

On the other hand, if it is determined that a lock-up release command has been inputted as important information from any of manager ECU 10, engine ECU 6, and brake ECU 8 (YES in S1010), such a lock-up pressure command as will immediately bring about a complete lock-up OFF condition is outputted to actuators (S1030).

Figure 16:
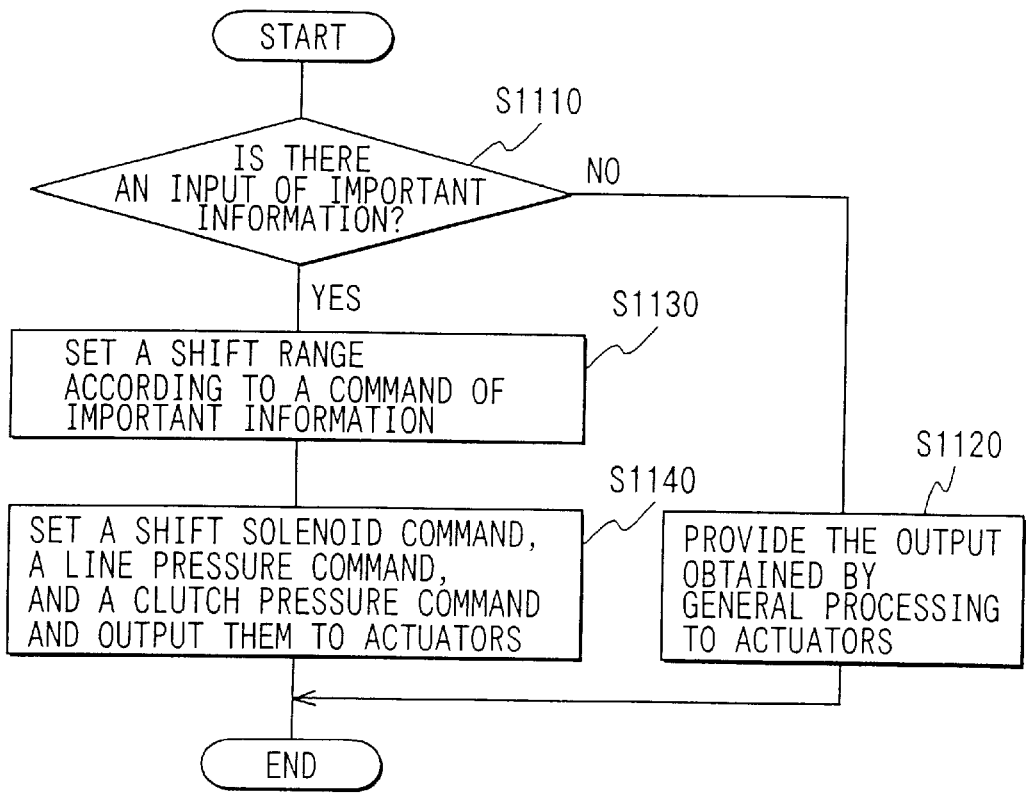
FIG. 16 is a flow chart showing an important processing which the brake ECU executes according to a command received from another ECU according to the invention.

Next, the processing on important shift operation is carried out in the important shift operation control unit in the fifth hierarchical level in FIG. 4. First, as shown in FIG. 16, a check is made to see if there is an input of important information to the important shift operation control unit from another ECU (manager ECU 10, engine ECU 6, or brake ECU 8) through the important information communication line L1 (S1110). If the result is negative (NO in S1110), a request command obtained by general processing is outputted as it is to actuators (S1120).

On the other hand, if it is determined that a command on gear shift has been inputted as important information from any of manager ECU 10, engine ECU 6, and brake ECU 8 (YES in S1110), a shift range corresponding to this command is set (S1130). In this case, even if another shifting operation is under execution by general processing which immediately precedes for example, the shifting operation based on the processing being considered is executed forcibly. Such a shifting operation may give rise to a large shock or damage of the clutch and, as the case may be, is therefore not executed in general processing. However, by processings in the manager ECU 10 and brake ECU 8, the throttle valve is fully closed and the supply of fuel is cut off in the engine ECU 6, so that the transfer torque is small and the shock is suppressed to a relatively small extent. Therefore, the shift request in question is accepted as it is and is executed.

In this case, however, it is necessary the clutch pressure and the line pressure be set so as to minimize shock and prevent damage of the clutch. Therefore, a shift solenoid command, a line pressure command, and a clutch pressure command for realizing such setting are outputted to actuators (S1140). The line pressure command and the clutch pressure command are issued by reference to a map preset for each of shift types having been subjected tuning actually in the vehicle.

Next, a description will be given below about the processing performed in the brake ECU 8.

The processing in the brake ECU 8 is carried out in the first hierarchical level in FIG. 5. In this processing, if there is no input of important information from another ECU (manager ECU 10, engine ECU 6, or ATECU 7) to the important brake operation control unit in the first hierarchical level through the important information communication line L1, a requested braking torque in general processing is set, while if there is an input of important information, a requested braking torque concerned is set, followed by the execution of general processing.

Second Embodiment

This second embodiment is different from the previous first embodiment in that the automatic transmission used is constituted not as the multi-stage transmission (AT) 4 but as a continuously variable transmission ("CVT" hereinafter) 4'. Other constructional points in this embodiment are almost the same as in the first embodiment. Therefore, reference will be made below to a general processing executed in CVTECU 7' which controls CVT 4', an important processing related to CVT 4', which is executed in the manager ECU 10, an important information setting processing which information is transmitted from CVTECU 7' to engine ECU 6, and a processing which the engine ECU 6 executes based on the important information provided from CVTECU 7'.

Reference will be made below first to a general processing in CVTECU 7'.

Figure 17:
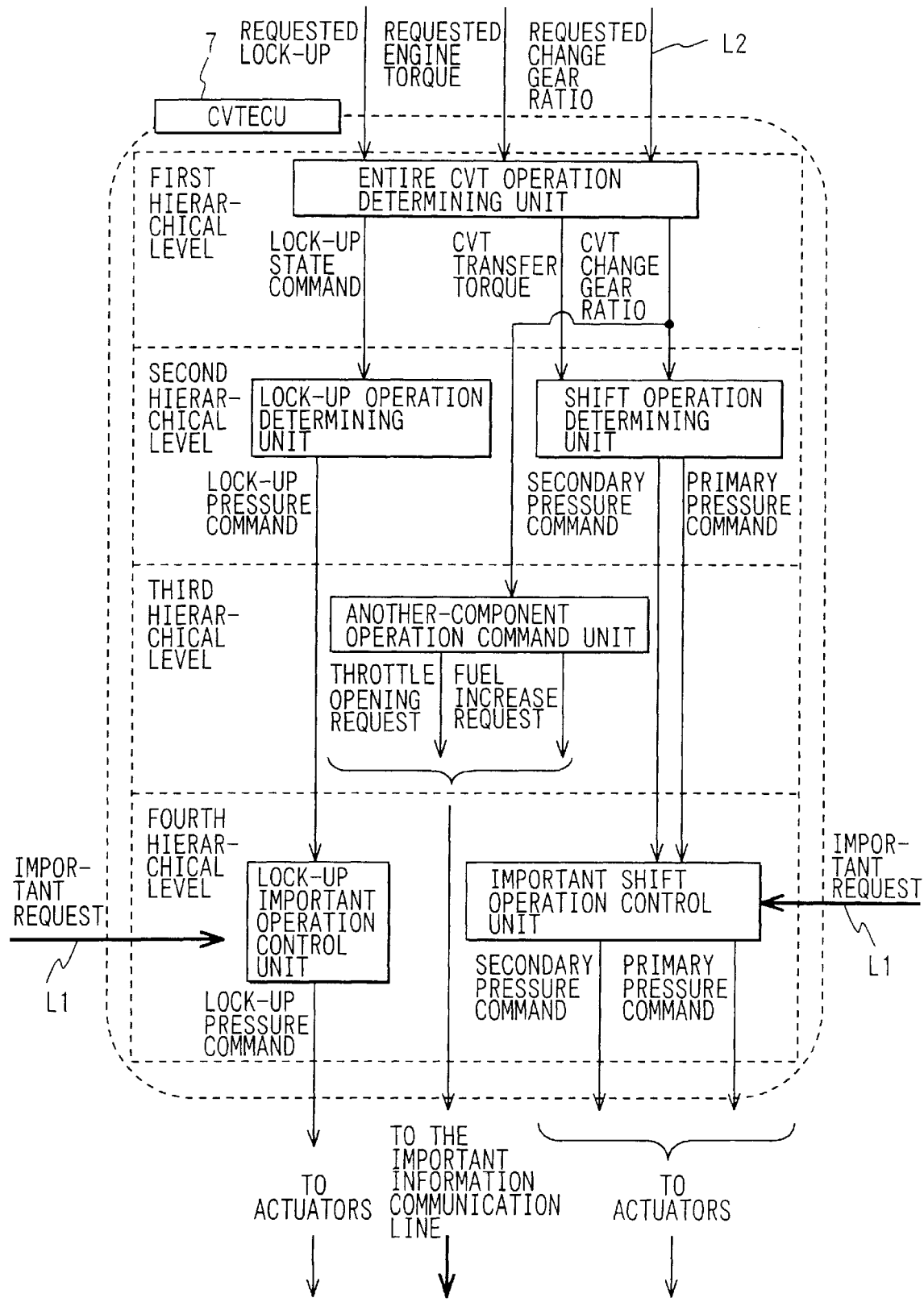
FIG. 17 is a block diagram showing a control processing executed for vehicle control by a CVTECU according to the invention.
Figure 18:
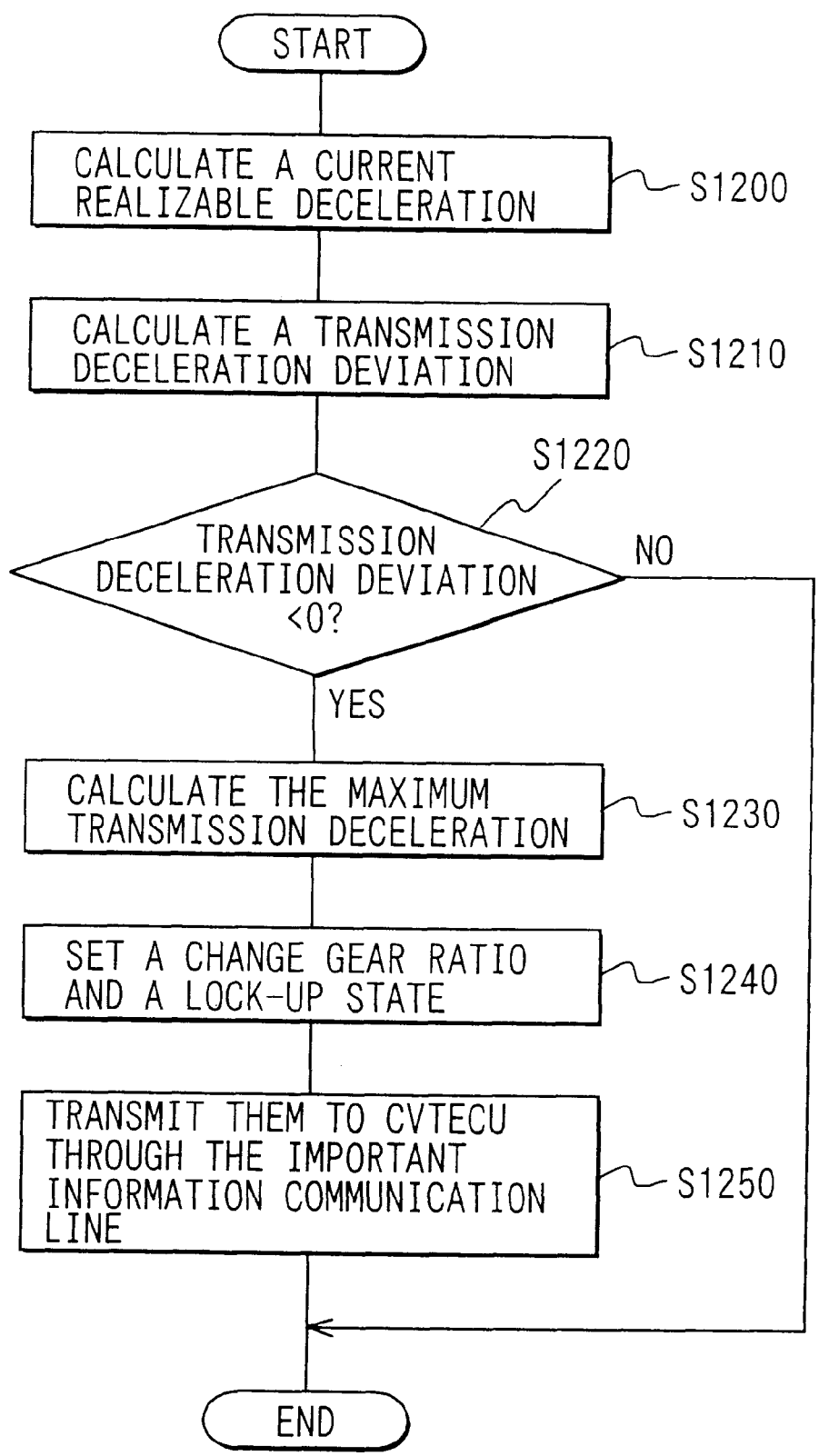
FIG. 18 is a flow chart showing an important processing executed by the transmission manipulated variable calculating unit in the manager ECU according to the invention.
Figure 19:
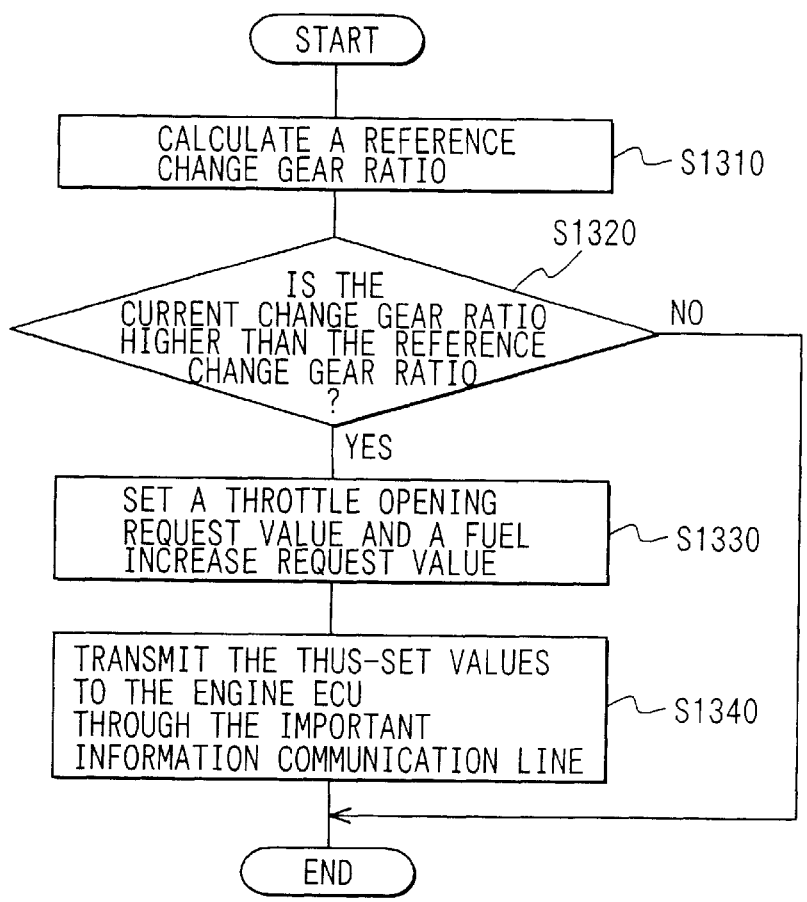
FIG. 19 is a flow chart showing an important processing which requests another ECU for operation in the CVTECU according to the invention.
Figure 21:
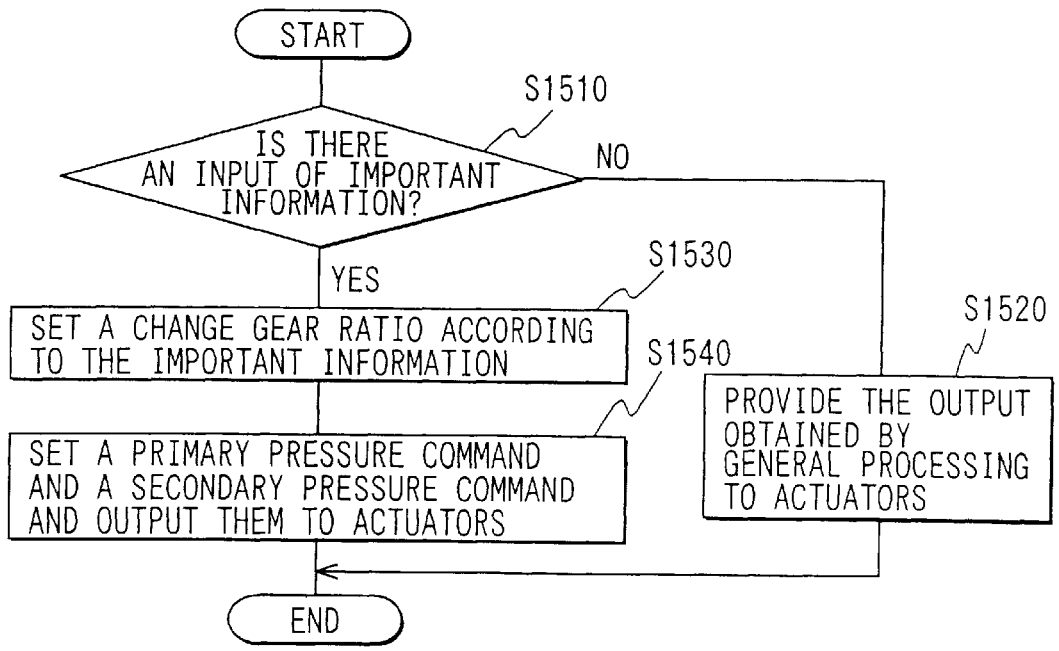
FIG. 21 is a flow chart showing an important processing which the CVTECU executes upon receipt of information from the CVTECU according to the invention.
Figure 20:
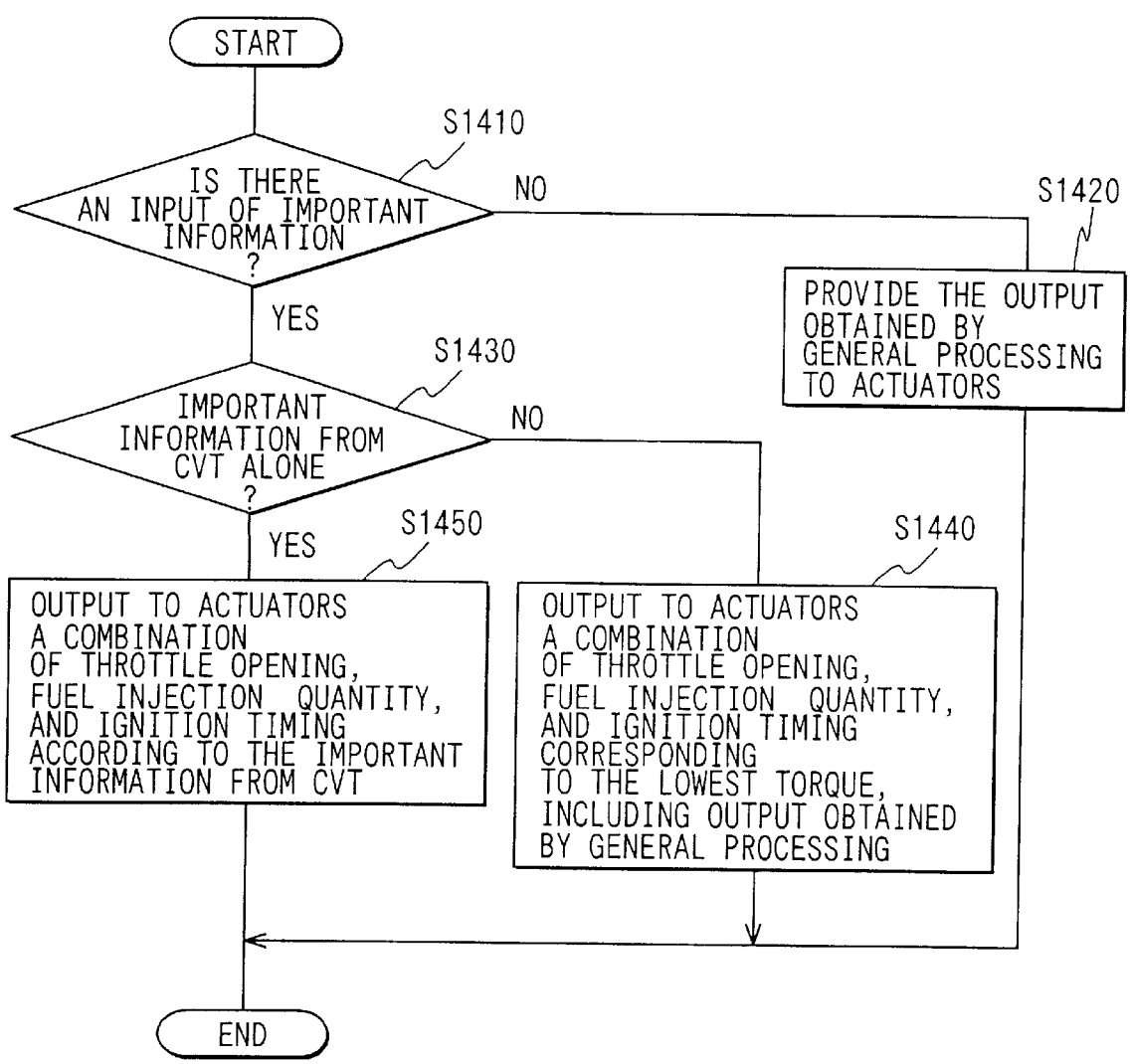
FIG. 20 is a flow chart showing an important processing which the engine ECU executes upon receipt of information from the CVTECU according to the invention.

FIG. 17 is a block diagram showing, in terms of functional blocks, a control processing executed in CVTECU 7'. As shown in the same figure, the control processing executed by CVTECU 7' has a configuration of four hierarchical levels, and a general processing is executed mainly in the first, second and fourth hierarchical levels.

First, in an entire CVT operation determining unit in the first hierarchical level, a lock-up state command, a CVT set change gear ratio, and a CVT transfer torque are set according to a requested engine torque, a requested change gear ratio, and a requested lock-up state state which have been inputted from the manager ECU 10 through the general information communication line L2.

To be more specific, when it is necessary to newly execute a shift control for realizing a requested change gear ratio, a CVT set change gear ratio is established taking into account an acceptable change gear ratio according to the current state of the transmission. For example, the prevention of over-revolution is taken into consideration.

As to the lock-up state command, even if the above requested lock-up state state requests turning ON the lock-up mechanism, it is impossible, as the case may be, to turn ON the lock-up mechanism, so such circumstances are taken into account in setting a lock-up state command. More particularly, at a low vehicle speed, it is necessary to turn OFF the lock-up mechanism for the prevention of engine stop. For this reason, even when the requested lock-up state state requests turning ON the lock-up mechanism, the lock-up state command is set to lock-up state OFF in a low vehicle speed range, while in the other range it is set to lock-up state ON.

As to the CVT transfer torque, since the magnitude of torque to be transferred through CVT 4' depends on engine torque, lock-up state and change gear ratio, the CVT transfer torque is set based on those parameters.

More specifically, for the engine torque, a torque amplification ratio of the torque converter corresponding to the lock-up state and the CVT set change gear ratio are multiplied by each other and the value obtained is set as CVT transfer torque.

In the subsequent second hierarchical level there are executed a lock-up processing by a lock-up operation determining unit and a shift processing by a transmission operation determining unit.

First, in the lock-up operation determining unit, a manipulated variable in the lock-up processing is calculated, while in the transmission operation determining unit, a manipulated variable in the shift processing is calculated.

The lock-up operation determining unit commands a lock-up clutch pressure so as to permit a gradual switching of lock-up condition, which is for preventing the occurrence of a shock at the time of switch-over of a lock-up state command. To be more specific, the state in which the clamp pressure of the lock-up clutch is maximum is assumed to be a complete lock-up ON state, while the state in which the clamp pressure of the lock-up clutch is minimum is assumed to be a complete lock-up OFF state. In case of the lock-up state command being ON and the lock-up state being a complete lock-up ON state or in case of the lock-up state command being OFF and the lock-up state being a complete lock-up OFF state, the clamp pressure of the lock-up clutch is maintained as it is. On the other hand, in case of the lock-up state command being ON and the lock-up state being not a complete lock-up ON state or in case of the lock-up state command being OFF and the lock-up state being not a complete lock-up OFF state, the clamp pressure of the lock-up clutch is increased or decreased with a predetermined gradient.

Next, in the transmission operation determining unit, a primary pressure command, a secondary pressure command, and an input torque adjustment quantity are calculated, which are for preventing the occurrence of abnormal shift shock or slippage at the time of gear shift.

To be more specific, since a change gear ratio depends on the balance between a primary pressure and a secondary pressure, both are set in a range which permits the transfer of CVT input torque without slippage within CVT 4'. This setting is made by making reference to a map of primary and secondary pressures which have been set according to CVT input torques and by adding thereto such a feedback term as diminishes the difference in actual CVT change gear ratio which can be calculated from CVT set change gear ratio and input/output revolutions ratio.

Next, in the important shift operation control unit and the important lock-up operation control unit in the fourth hierarchical level, a primary pressure command, a secondary pressure command, and a lock-up pressure command are outputted as they are to corresponding actuators if an important processing (important information) request to be described later is not inputted through the important information communication line L1.

In the above description the entire CVT operation determining unit, the lock-up operation determining unit, and the shift operation determining unit correspond to the manipulated variable calculating means, while the important transmission operation control unit and the important lock-up operation control unit correspond to the control means.

Next, a description will be given below about an important processing which the manager ECU 10 executes for CVTECU 7'.

This important processing is carried out in the transmission manipulated variable calculating unit in the manager control unit shown in FIG. 2 in the case where the Quick Transmission Deceleration Flag referred to in the previous first embodiment is ON, and a required change gear ratio and a required lock-up state are determined so as to implement a required deceleration. This processing is illustrated in the flow chart of FIG. 18.

First, a current realizable deceleration capable of being realized in a fully closed state of the throttle valve and a fuel supply cut-off state is calculated (S1200). This current realizable acceleration represents the magnitude of deceleration capable of being realized by only a decelerating operation in the engine in the current change gear ratio and lock-up state and it is set according to change gear ratio, lock-up state, and vehicle speed.

Subsequently, a transmission deceleration deviation is calculated as the difference between the current realizable deceleration and the required deceleration (S1219) and the magnitude thereof is determined (S1220).

If the transmission deceleration deviation is determined to be not smaller than zero, that is, if the required deceleration is determined to be smaller than the current realizable deceleration (NO in S1220), it is determined that the required deceleration can be implemented by only a decelerating operation in the engine, and the processing is ended.

On the other hand, if it is determined in S1220 that the transmission deceleration deviation is smaller than zero, that is, the current realizable deceleration is not higher than the required deceleration, (YES in S1220), it is determined that it is necessary to concretely calculate a manipulated variable for reducing torque by a shift control. Then, there is first calculated a maximum transmission deceleration in case of setting a change gear ratio in a lock-up OFF state which change gear ratio can be set in a range not causing over-revolution relative to the current requested change gear ratio obtained by general processing just before (S1230). This maximum transmission deceleration is obtained by making reference to a deceleration map preset according to change gear ratios, lock-up states, and vehicle speeds.

Then, a shift range which implements the maximum transmission deceleration and a lock-up state are set as a requested change gear ratio and a requested lock-up state state, respectively, (S1240) and are transmitted to CVTECU 7' through the important information communication line L1 (S1250).

The following description is now provided about an important processing in which an operation for another ECU is requested in CVTECU 7'.

Here, from the standpoint that the change gear ratio is preferably returned to the lowest side until stop of the vehicle in case of adopting CVT as an automatic transmission, there is executed an auxiliary processing for enhancing the engine torque and thereby restoring the change gear ratio to the lowest side in case of the change gear ratio being incapable of return to the lowest side before stop of the vehicle due to sudden braking. This processing is executed in an another-component command unit in the third hierarchical level shown in FIG. 17 and according to the flow chart of FIG. 19.

First, a reference change gear ratio is calculated based on a vehicular state quantity which has been inputted to the another-component command unit from the general information communication line L2 through the entire CVT operation determining unit (S1310). This reference change gear ratio is an index for determining whether it will be possible to restore the change gear ratio to the lowest side before stop of the vehicle relative to the current vehicle speed. It is preset with vehicle speed as a parameter.

Then, the reference change gear ratio is compared with the current change gear ratio in CVT 4' and a check is made to see whether the current change gear ratio lies on the high side (S1320). If the result is negative (NO in S1320), it is determined that a shifting operation can be done by only CVT 4', and the processing is ended.

On the other hand, if the current change gear ratio is determined to be on a higher side than the reference change gear ratio (YES in S1320), it is determined that there a shifting operation can be done by only CVT 4' and that an auxiliary processing by engine control is needed, and a throttle opening request value and a fuel increase request value are set (S1330). In this case, a larger engine torque is preferred for shifting the change gear ratio to the low side, but if the throttle valve opening and the amount of fuel are increased too much for that purpose, there is a fear that the vehicle may accelerate during the application of sudden brakes. Therefore, the above values are set appropriately based on evaluation results obtained actually in the vehicle.

The values thus set are sent to the engine ECU 6 through the important information communication line L1 (S1340).

In the above description the function of performing a predetermined arithmetic processing by the another-component operation command unit and transmitting manipulated variable as the results of the arithmetic processing to the engine ECU 6 through the important information communication line L1 corresponds to the function of the important information transmitting means.

Next, reference will be made below to an important processing which another ECU executes upon receipt of information from CVTECU 7'.

This important information is executed in the engine ECU6 and CVTECU 7'.

Description is first directed to a processing carried out in the engine ECU 6. This processing is executed in the fourth hierarchical level in FIG. 3 and according to the procedure shown in the flow chart of FIG. 20.

First, a check is made to see if there is an input of important information from another ECU to the important engine operation control unit through the important information communication line L1 (S1410). If the result is negative (NO in S1410), requests of throttle opening, fuel injection quantity, and ignition timing by general processing are outputted to actuators (S1420).

On the other hand, if it is determined that there is an input of important information (YES in S1410), a check is then made to see whether this important information is only the input from CVTECU 7', that is, whether there is no input of important information from the manager ECU 10 and brake ECU 8 (S1430). If it is determined that this important information is not the input alone from the CVTECU 7' (NO in S1430), commands of throttle opening, fuel injection quantity, and ignition timing corresponding to the setting of the lowest torque are established from among a requested output by general processing and important information pieces provided from the manager ECU 10 and brake ECU 8, and are outputted to actuators (S1440).

On the other hand, if it is determined that the important information is only the input from CVTECU 7' (YES in S1430), a throttle opening and a fuel injection quantity are set according to information provided from CVTECU 7'. As to the ignition timing, a timing in general processing is established and outputted to actuators (S1450).

A description will now be given of a processing executed in CVTECU 7'. This processing is carried out in the fourth hierarchical level in FIG. 17 and according to the procedure illustrated in the flow chart of FIG. 21.

First, a check is made to see if there is an input of important information from another CPU through the important information communication line L1 (S1510). If the result is negative (NO in S1510), commands obtained in general processing are outputted as they are to actuators (S1520).

On the other hand, if it is determined that there is an input of important information (YES in S1510) and if this important information is related to a gear shift, a change gear ratio corresponding to the important information is set (S1530), also established are a primary pressure and a secondary pressure for implementing the change gear ratio, then a primary pressure command and a secondary pressure command, indicative of both pressures, are outputted to actuators (S1540).

As to the processing executed in case of important information being related to a lock-up state, an explanation thereof will here be omitted because it is the same as is the case with AT 4 shown in the first embodiment (FIG. 15).

In the vehicular control system in each of the above embodiments, as described above, when important information requiring urgency for another ECU occurs in any of engine ECU 6, ATECU 7, CVTECU 7', and brake ECU 8, this important information is transmitted directly to the ECU concerned through the important information communication line L1 and without going through the manager ECU 10. Therefore, the control means in the ECU which has received this important information can immediately control the corresponding component (engine 2, AT 4, CVT 4', or brakes 5) according to the important information. Consequently, such a response delay caused by going through the manager ECU in the conventional integrated vehicle control system does not occur.

Also in the manager ECU 10, upon occurrence of important information, the normal determination of operation guide for each ECU, which is done through the drive system/brake system operation determining unit and the drive system operation guide determining unit, is not performed, but a control command or manipulated variable corresponding to the important information is transmitted directly to each ECU. Since the determination of operation guide is thus omitted, it is possible to let the control means in each ECU execute control so much rapidly.

Further, since the important information communication line L1 for the transmission of important information is constituted as a dedicated communication line, the congestion of communication is not likely to occur and important information can be transmitted more reliably and rapidly.

Thus, according to the integrated vehicle control system described in each of the above embodiments, it is possible to take a quick measure against a vehicular urgent condition and keep the vehicular behavior stable.

Although the present invention has been described above by way of embodiments thereof, it is of course that no limitation is made thereto and that various modifications may be made as long as they fall under the technical scope of the present invention.

For example, although in the above embodiments the present invention has been described with reference to an example in which the vehicular control system is for integratedly controlling engine 2, AT 4 or CVT 4', and brakes 5 as components of the vehicular drive system, for simplifying the explanation of the same system, it is of course that the present invention is also applicable to a system which integratedly controls auxiliary devices such as an air conditioner or other various components in the same way as above.

While the above-described embodiments refer to examples of usage of the present invention, it is understood that the present invention may be applied to other usage, modifications and variations of the same, and is not limited to the disclosure provided herein.

What is claimed is:

1. An integrated vehicle control system comprising:

a plurality of component control units which respectively control a plurality of components of a vehicle according to preset control programs;

a manager control unit which issues commands of operation guides to the plurality of component control units, the operation guides being for the components controlled by the component control units; and a communication line which connects the manager control unit and the component control units and connects the component control units together;

wherein each of the plurality of component control units includes a manipulated variable calculating means which calculates a manipulated variable of components controlled by the component control unit, the calculating means being based on the operation guide received from the manager control unit through the communication line, each of the plurality of component control units including a control means which controls the components according to the manipulated variable calculated by the manipulated variable calculating means;

at least one of the plurality of component control units has an important information transmitting means which determines whether an urgent control for any of remaining component control units is necessary based on operational conditions of the components, wherein the one of the plurality of component control units transmits important information directly to a component control unit that requires urgent control through the communication line; and the control means thereof controls the component based on the important information when the component control unit requiring urgent control receives the important information.

2. An integrated vehicle control system comprising:

a plurality of component control units which respectively control a plurality of components of a vehicle according to preset control programs;

a manager control unit which issues commands of operation guides to the plurality of component control units, the operation guides being for the components controlled by the component control units; and a communication line which connects the manager control unit and the component control units and connects the component control units together;

wherein each of the plurality of component control units includes a manipulated variable calculating means which calculates a manipulated variable of components controlled by the component control unit, the calculating means being based on the operation guide received from the manager control unit through the communication line, each of the plurality of component control units including a control means which controls the components according to the manipulated variable calculated by the manipulated variable calculating means;

at least one of the plurality of component control units having an important information transmitting means which determines whether an urgent control for any remaining component control units is necessary based on operational conditions of the components, wherein one of the plurality of component control units transmits important information directly to a component control unit that requires urgent control through the communication line;

the control means thereof controls the component based on the important information when the component control unit requiring urgent control receives the important information; and wherein the manager control unit comprises:

an entire vehicle operation determining unit which determines an operation guide for a whole of a vehicle based on operational information on components received from the component control units through the communication line;

an operation guide determining means which determines operation guides for the components based on the operation guide for the whole of the vehicle determined by the entire vehicle operation determining means;

a general information transmitting means which transmits the operation guides determined by the operation guide determining means to the corresponding component control unit through the communication line; and a second important information transmitting means which transmits the important information to a corresponding component control unit without going through the operation guide determining means when the operation guide for the whole of the vehicle determined by the entire vehicle operation determining means corresponds to the important information.

3. An integrated vehicle control system according to claim 1, wherein:

at least one of the component control units is further provided with a second manipulated variable calculating means which calculates a second manipulated variable for controlling the component requiring urgent control when it is determined that an urgent control for any other component control units is necessary based on the operational conditions of the components;

the important information transmitting means transmits the second manipulated variable calculated by the second manipulated variable calculating means as the important information to the control means in the component control unit which controls a specific component; and the control means in the component control unit controls the specific component according to the received manipulated variable upon receipt of the manipulated variable as the important information from the important information transmitting means.

4. An integrated vehicle control system according to claim 2, wherein:

the manager control unit is further provided with a manipulated variable calculating means which calculates a manipulated variable for controlling a specific component according to the important information when the operation guide for the whole of the vehicle determined by the entire vehicle operation determining unit corresponds to the important information;

the second important information transmitting means transmits the manipulated variable calculated by the manipulated variable calculating means as the important information to the control means in the component control unit which controls the specific component; and the control means in the component control unit controls the specific component according to the received manipulated variable upon receipt of the manipulated variable as the important information from the second important information transmitting means in the manager control unit.

5. An integrated vehicle control system according to claim 2, wherein each of the important information transmitting means and the second important information transmitting means transmits important information portions according to a predetermined order of priority when a plurality of types of information portions occur simultaneously as the important information.

6. An integrated vehicle control system according to claim 1, wherein the control means in the component control unit which has received the important information portions executes a control processing based on the important information portions according to a predetermined order of priority when any of the component control units receives a plurality of types of information portions simultaneously as the important information.

7. An integrated vehicle control system according to claim 4, wherein the manipulated variable calculating means makes reference to the operation guide determined by the operation guide determining means before the execution of the processing based on the important information.

8. An integrated vehicle control system according to claim 1, wherein:

the component control units include a power control unit for controlling a driving force generator mounted as one of the components on the vehicle and a brake control unit for controlling brakes mounted as one of the components on the vehicle; and the brake control unit issues a command to decrease a driving force of the driving force generator to the power control unit upon functional deterioration of the brakes, the command being the important information.

9. An integrated vehicle control system according to claim 1, wherein:

the component control units include a power control unit for controlling a driving force generator mounted as one of the components on the vehicle and a shift control unit for controlling a transmission mounted as one of the components on the vehicle; and the shift control unit issues a command to to decrease a driving force of the driving force generator during a shifting operation of the transmission to the power control unit, the command being the important information.

10. An integrated vehicle control system according to claim 8, wherein the driving force generator controlled by the power control unit is an engine, a control means being provided in the power control unit, when the driving force of the engine is decreased according to the important information, executes at least one of an intake volume decreasing control for decreasing the amount of intake air to the engine, an ignition timing retarding control for retarding an ignition timing for the engine, and an injection volume decreasing control for decreasing the amount of fuel injected into the engine.

11. An integrated vehicle control system according to claim 1, comprising:

the component control units include a power control unit for controlling an engine mounted as one of the components on the vehicle and a shift control unit for controlling a transmission mounted as one of the components on the vehicle and equipped with a torque converter and a lock-up mechanism;

the power control unit issuing a command to release the lock-up mechanism in the transmission when the air-fuel ratio during combustion of fuel in the engine is changed abruptly, the command being the important information, to the shift control unit.

12. An integrated vehicle control system according to claim 1, wherein:

the component control units include a brake control unit for controlling brakes mounted as one of the components on the vehicle and a shift control unit for controlling a transmission mounted as one of the components on the vehicle and equipped with a torque converter and a lock-up mechanism;

the brake control unit issues a command to the shift control unit to release the lock-up mechanism in the transmission during a start of the brake actuation, the command being the important information.

13. An integrated vehicle control system according to claim 1, wherein:

the component control units include a brake control unit for controlling brakes mounted as one of the components on the vehicle, the brake control unit having an anti-lock function and a shift control unit for controlling a transmission that is one of the components on the vehicle;

the brake control unit issues a command to the shift control unit to change a gear ratio of the transmission to decrease the ratio of an input number of revolutions to an output number of revolutions in the transmission during a start of the anti-lock function of the brakes, the command being the important information.

14. An integrated vehicle control system according to claim 1, wherein:

The component control units include a power control unit for controlling a driving force generator mounted as one of the components on the vehicle and a shift control unit for controlling a continuously variable transmission mounted as one of the components on the vehicle;

the shift control unit having a means for transmitting information to the power control unit to change a gear ratio to increase the ratio of an input number of revolutions to an output number of revolutions in the continuously variable transmission, the means for transmitting being the important information transmitting means, the information being the important information;

wherein the control means in the power control unit enhances a driving force of the driving force generator when the power control unit receives the important information from the shift control unit during operation of brakes of the vehicle.

15. An integrated vehicle control system according to claim 14, wherein the driving force generator controlled by the power control unit is an engine, the control means in the power control unit executes at least an intake volume increasing control for increasing the amount of intake air to the engine or an injection volume increasing control for increasing an amount of fuel injected into the engine when the driving force of the engine is to be enhanced based on the important information.

16. An integrated vehicle control system according to claim 2, wherein:

information provided from a radar system which measures a distance between the vehicle and an object present ahead of the vehicle is input to the manager control unit; and the second important information transmitting means determines whether a danger of collision between the vehicle and the object is high based on the information provided from the radar system, the second important information transmitting means transmits a deceleration command to the corresponding component control unit for causing a predetermined component to operate in a decelerating direction of the vehicle if the result is high, the deceleration command being the important information.

17. An integrated vehicle control system according to claim 16, wherein the second important information transmitting means transmits a command to the power control unit which controls the driving force generator for decreasing the driving force generated by the driving force generator mounted on the vehicle as the deceleration command.

18. An integrated vehicle control system according to claim 16, wherein the second important information transmitting means transmits a command to the shift control unit which controls the transmission for setting a change gear ratio of the transmission to increase the ratio of an input number of revolutions to an output number of revolutions in the transmission, the command being the deceleration command.

19. An integrated vehicle control system according to claim 16, wherein the second important information transmitting means transmits a command for enhancing a braking torque generated by the brakes mounted on the vehicle, the command being the deceleration command to the brake control unit which controls the brakes.

20. An integrated vehicle control system according to claim 1, wherein the manager control unit and the plural component control units are each constructed with an independent electronic control unit which is a microcomputer.

21. An integrated vehicle control system according to claim 1, wherein the communication line comprises an important information communication line for transmission of the important information and a general information communication line for transmission of other information.

22. An integrated vehicle control system comprising:

a plurality of component control units respectively controlling a plurality of components of a vehicle;

a manager control unit which issues commands of operation guides to the plurality of component control units, the operation guides being for the components controlled by the component control units; and a communication line which connects the manager control unit and the component control units and connects the component control units together;

wherein at least one of the plurality of component control units comprises an important information transmitting means which determines whether an urgent control for any remaining component control unit is necessary based on operational conditions of the components, wherein at least one of the plurality of component control units transmits important information directly to a component control unit that requires urgent control through the communication line.

23. An integrated vehicle control system according to claim 22, wherein said component control units control said components according to preset control programs.

24. An integrated vehicle control system according to claim 22, wherein said control system performs control functions for regular vehicle operation functions.

* * * * *